(12) United States Patent
Jung et al.

(10) Patent No.: US 9,226,103 B2
(45) Date of Patent: Dec. 29, 2015

(54) LOCATION ASSISTANCE IN A PAIRED DEVICE

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 1918 days.

(21) Appl. No.: 11/900,642

(22) Filed: Sep. 11, 2007

(65) Prior Publication Data
US 2009/0061896 A1    Mar. 5, 2009

Related U.S. Application Data

(63) Continuation-in-part of application No. 11/897,961, filed on Aug. 31, 2007.

(51) Int. Cl.
*H04W 4/02*    (2009.01)
*H04L 29/08*    (2006.01)

(52) U.S. Cl.
CPC .............. *H04W 4/02* (2013.01); *H04L 67/18* (2013.01); *H04W 4/023* (2013.01)

(58) Field of Classification Search
CPC ....... H04W 4/02; H04W 4/023; H04W 4/025; H04L 67/18; H04L 67/22; H04L 67/24; H04M 2242/30; H04M 3/42348
USPC ............... 455/401.1–401.2, 414.1–414.3, 455/456.1–457, 466
See application file for complete search history.

(56) References Cited

U.S. PATENT DOCUMENTS

| | | | |
|---|---|---|---|
| 6,879,835 B2 * | 4/2005 | Greene et al. | 455/456.1 |
| 7,283,827 B2 * | 10/2007 | Meadows et al. | 455/456.1 |
| 7,412,226 B2 * | 8/2008 | Kayzar et al. | 455/404.2 |
| 7,519,376 B2 | 4/2009 | Chang | |
| 7,742,774 B2 | 6/2010 | Oh et al. | |

(Continued)

OTHER PUBLICATIONS

"Customer Support Knowledge Library Bluetooth Pairing: definition and overview"; palm.com; pp. 1-2; printed on Aug. 22, 2007; located at http://kb.palm.com/SRVS/CGI-BIN/WEBCGI.EXE/,/?St=58,E=000 . . . .

(Continued)

*Primary Examiner* — George Eng
*Assistant Examiner* — Marcus Hammonds

(57) ABSTRACT

Embodiments provide an apparatus, a system, a device, and a method. A method includes a method implemented in a second mobile wireless communication device. The method includes transmitting a request for data indicative of a location of a first wireless communication device. The method also includes receiving an affirmative reply to the request for data indicative of a location of a first wireless communication device. The affirmative reply originating from the first wireless communication device and generated in response to an input received from a human user of the first wireless communication device. The method further includes receiving the data indicative of a location of the first wireless communication device. The method may include displaying information usable in directing at least one of a person, vehicle, craft, or airplane associated with the second mobile wireless communication device to the location of the first wireless communication device.

45 Claims, 25 Drawing Sheets

(56) References Cited

U.S. PATENT DOCUMENTS

| | | | |
|---|---|---|---|
| 2002/0169539 A1* | 11/2002 | Menard et al. | 701/200 |
| 2005/0227676 A1* | 10/2005 | De Vries | 455/414.1 |
| 2006/0030339 A1* | 2/2006 | Zhovnirovsky et al. | 455/456.6 |
| 2006/0223518 A1* | 10/2006 | Haney | 455/420 |
| 2008/0155257 A1 | 6/2008 | Werner et al. | |

OTHER PUBLICATIONS

"Preposition of Spatial Relationship"; Owl Online Writing Lab; bearing dates of 1995-2004; pp. 1-4; Purdue University; printed on Aug. 22, 2007; located at http://owl.english.purdue.edu/handouts/print/esl/eslprep3.html.

"Rino 520"; Garmin; bearing dates of 1996-2007; pp. 1-2; printed on Aug. 29, 2007; located at https://buy.garmin.com/shop/shop.do?pID=6406&tab=rino520.

"Unit 12—Relationships Among Spatial Objects"; bearing a date of Aug. 30, 1997; pp. 1-8; University of British Columbia; printed on Aug. 22, 2007; located at http://www.geog.ubc.ca/courses/klink/gis.notes/ncgia/u12.html.

\* cited by examiner

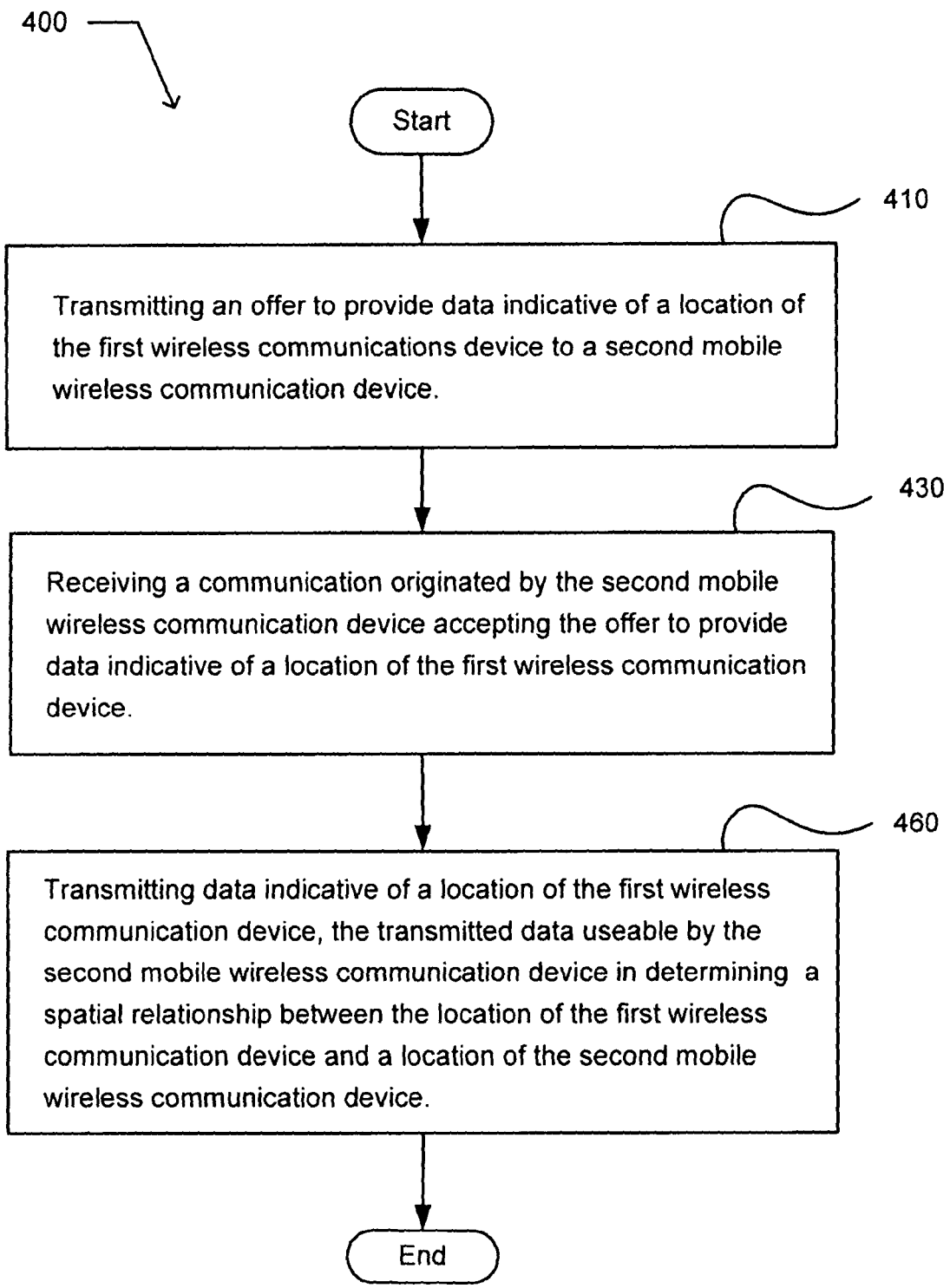

FIG. 6

410 — Transmitting an offer to provide data indicative of a location of the first wireless communications device to a second mobile wireless communication device.

412 Transmitting in response to an authorization input received from a human user of the first wireless communication device an offer to provide data indicative of a location of the first wireless communications device to a second mobile wireless communication device.

414 Transmitting from a first mobile wireless communications device an offer to provide data indicative of a location of the first mobile wireless communications device to a second mobile wireless communication device.

416 Transmitting from a first wireless communications device an indication of availability to provide data indicative of a location of the first wireless communications device to a second mobile wireless communication device.

418 Transmitting from a first positioning-enabled wireless communications device an offer to provide data indicative of a location of the first wireless communications device to a second mobile wireless communication device.

422 Transmitting an offer to provide data indicative of a location of the first wireless communications device to a second mobile wireless communication device and to a third mobile wireless communications device.

Receiving a communication originated by the second mobile wireless communication device accepting the offer to provide data indicative of a location of the first wireless communication device, the transmitted data useable by the second mobile wireless communication device in determining a spatial relationship between the location of the first wireless communication device and a location of second mobile wireless communication device.

---

462 Transmitting data indicative of a position, a route, a speed, and/or a direction of the first wireless communication device.

464 Transmitting data indicative of an at least substantially stationary location, or a moving location of the first wireless communication device.

---

466 Transmitting data indicative of a location of the first wireless communication device, the transmitted data useable by the second mobile wireless communication device in displaying information indicative of a spatial relationship between the location of the first wireless communication device and a location of the second mobile wireless communication device.

---

468 Transmitting data indicative of a location of the first wireless communication device, the transmitted data useable by the second mobile wireless communication device in generating information usable in directing at least one of a person, vehicle, craft, or plane associated with the second mobile wireless communication device to a location proximate to the location of the first wireless communication device.

---

472 Transmitting data indicative of a location of the first wireless communication device, the transmitted data useable by the second mobile wireless communication device in generating information usable in directing at least one of a person, vehicle, craft, or plane associated with the second mobile wireless communication device to the location of the first wireless communication device.

Receiving a communication originated by the second mobile wireless communication device accepting the offer to provide data indicative of a location of the first wireless communication device, the transmitted data useable by the second mobile wireless communication device in determining a spatial relationship between the location of the first wireless communication device and a location of second mobile wireless communication device.

474 Transmitting data indicative of a location of the first wireless communication device for a limited time.

Transmitting a request for data indicative of a location of a first wireless communication device.

1112 Transmitting a request for data indicative of a location of a first wireless communication device in response to an input received from a human user of the second mobile wireless communication device.

1114 Transmitting a request for data indicative of a location of a first mobile wireless communication device.

1116 Transmitting a request for data indicative of a location of a positioning-enabled first mobile wireless communication device.

1118 Transmitting a request for data indicative of dynamic locations of a first mobile wireless communication device.

1122 Transmitting a request that data indicative of a location of a first wireless communication device be provided to the second mobile wireless communication device and to a third mobile wireless communications device.

Receiving an affirmative reply to the request for data indicative of a location of a first wireless communication device, the affirmative reply originating from the first wireless communication device and generated in response to an input received from a human user of the first wireless communication device.

1142 Receiving proximate in time to the transmission of the request an affirmative reply to the request for data indicative of a location of a first wireless communication device, the affirmative reply originating from the first wireless communication device and generated in response to an input received from a human user of the first wireless communication device.

1144 Receiving subsequent to the transmission of the request an affirmative reply to the request for data indicative of a location of a first wireless communication device, the affirmative reply originating from the first wireless communication device and generated in response to an input received from a human user of the first wireless communication device.

1146 Receiving in response to the transmitted request an affirmative reply to the request for data indicative of a location of a first wireless communication device, the affirmative reply originating from the first wireless communication device and generated in response to an input received from a human user of the first wireless communication device.

FIG. 24

1310 Means for transmitting a request for data indicative of a location of a first wireless communication device.

1320 Means for receiving an affirmative reply to the request for data indicative of a location of a first wireless communication device, the affirmative reply originating from the first wireless communication device and generated in response to an input received from a human user of the first wireless communication device.

1330 Means for receiving the data indicative of a location of the first wireless communication device.

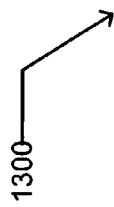

1300

LOCATION ASSISTANCE IN A PAIRED DEVICE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/897,961, entitled AUTHORIZED TRANSMISSION OF NAVIGATION ASSISTANCE, naming EDWARD K. Y. JUNG; ROYCE A. LEVIEN; ROBERT W. LORD; MARK A. MALAMUD; JOHN D. RINALDO, JR. as inventors, filed Aug. 31, 2007, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

An embodiment provides method implemented in a second mobile wireless communication device. The method includes receiving ongoing data indicative of a location of a first mobile wireless communications device from the first mobile wireless communications device in response to respective human-user initiated authorizations exchanged between the two mobile wireless communications devices. In addition to the foregoing, other method embodiments are described in the claims, drawings, and text that form a part of the present application.

Another embodiment provides a method implemented in a second mobile wireless communication device. The method includes transmitting a request for data indicative of a location of a first wireless communication device. The method also includes receiving an affirmative reply to the request for data indicative of a location of a first wireless communication device. The affirmative reply originating from the first wireless communication device and generated in response to an input received from a human user of the first wireless communication device. The method further includes receiving the data indicative of a location of the first wireless communication device. The method may include displaying information usable in directing at least one of a person, vehicle, craft, or airplane associated with the second mobile wireless communication device to the location of the first wireless communication device. In addition to the foregoing, other method embodiments are described in the claims, drawings, and text that form a part of the present application.

A further embodiment provides a second mobile wireless communication device. The second mobile wireless communication device includes a navigation pairing initiation circuit operable to call for data indicative of a position of a first wireless communication device. The second mobile wireless communication device also includes a navigation pairing confirmation circuit operable to receive an indication of an authorization permitting provision of the data indicative of a position of a first wireless communication device to the second mobile wireless mobile communication device. The second mobile wireless communication device further includes a guidance circuit operable to receive the data indicative of a position of the first wireless communication device. In addition to the foregoing, other device embodiments are described in the claims, drawings, and text that form a part of the present application.

An embodiment provides a second mobile wireless communication apparatus. The second mobile wireless communication apparatus includes means for transmitting a request for data indicative of a location of a first wireless communication device. The second mobile wireless communication apparatus also includes means for receiving an affirmative reply to the request for data indicative of a location of a first wireless communication device. The affirmative reply originating from the first wireless communication device and generated in response to an input received from a human user of the first wireless communication device. The second mobile wireless communication apparatus also includes means for receiving the data indicative of a location of the first wireless communication device. In addition to the foregoing, other apparatus embodiments are described in the claims, drawings, and text that form a part of the present application.

Another embodiment provides a method performed in a first mobile wireless communications device. The method includes receiving a request originating from a second mobile wireless communication device for data indicative of a position of the first mobile wireless communication device. The method also includes transmitting an affirmative reply to the request in response to an input received from a human user of the first mobile wireless communication device. The method further includes facilitating a transmission of the data originating from the first wireless communication device indicative of a position of the first wireless communication device. The transmitted data being usable by the second mobile wireless communication device in determining a spatial relationship between the location of the first wireless communication device and a location of the second mobile wireless communication device. In addition to the foregoing, other method embodiments are described in the claims, drawings, and text that form a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5 illustrates an example of an operational flow performed in a first wireless communication device;

FIG. 6 illustrates an alternative embodiment of the operational flow described in conjunction with FIG. 5;

FIG. 9 illustrates an alternative embodiment of the operational flow described in conjunction with FIG. 5;

FIG. 10 illustrates another alternative embodiment of the operational flow described in conjunction with FIG. 5;

FIG. 18 illustrates an alternative embodiment of the operational flow of FIG. 17;

FIG. 19 illustrates another embodiment of the operational flow of FIG. 17;

FIG. 24 illustrates an example wireless communication apparatus; and

DETAILED DESCRIPTION

Figure 1:
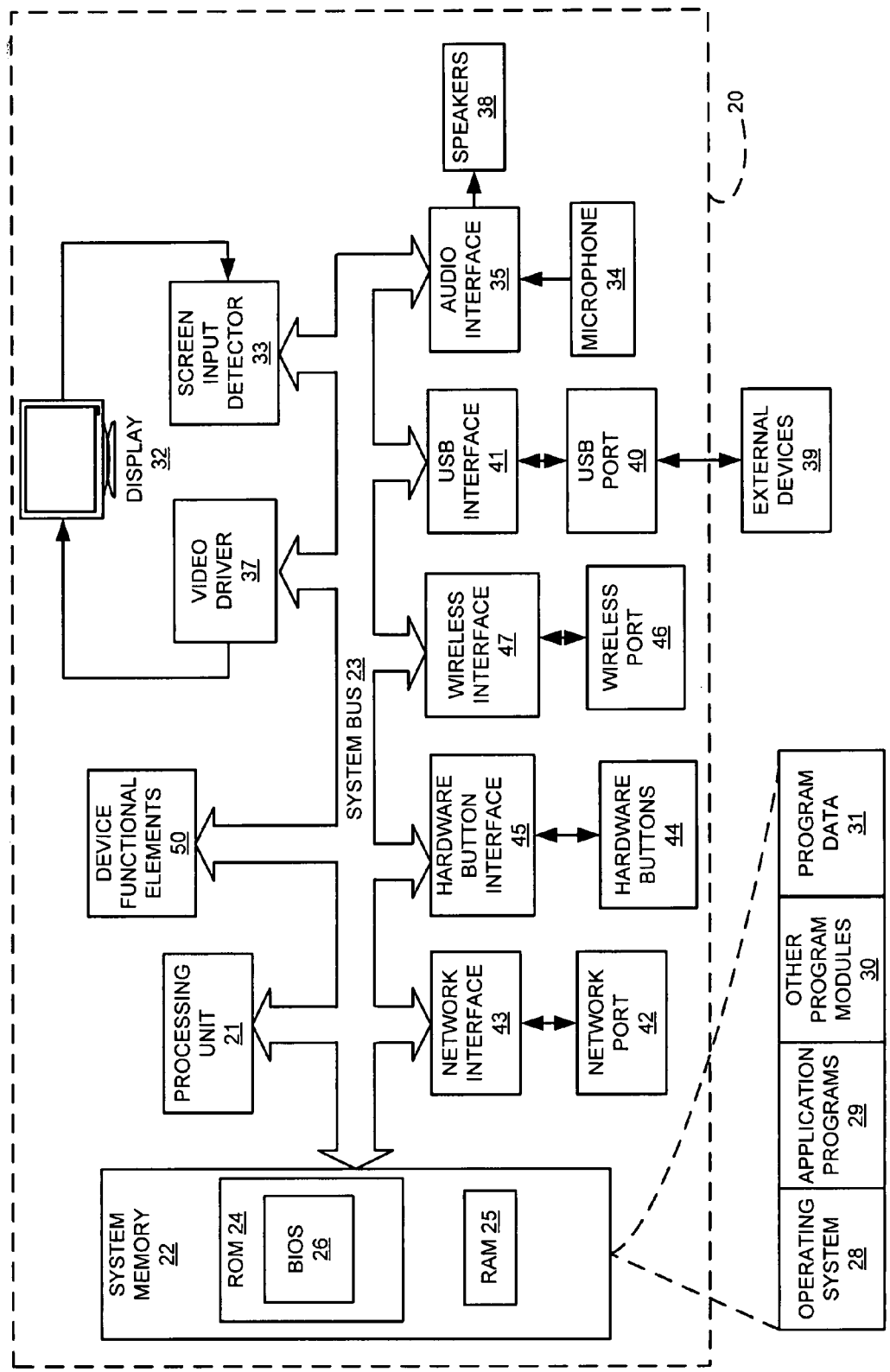
FIG. 1 illustrates an exemplary embodiment of a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 and the following discussion are intended to provide a brief, general description of an environment in which embodiments may be implemented. FIG. 1 illustrates an exemplary system that includes a thin computing device 20, which may be included in an electronic device that also includes a device functional element 50. For example, the electronic device may include any item having electrical and/or electronic components playing a role in a functionality of the item, such as a limited resource computing device, a wireless communication device, a mobile wireless communication device, an electronic pen, a handheld electronic writing device, a digital camera, a scanner, an ultrasound device, an x-ray machine, a non-invasive imaging device, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface. The user interface may include a character, a key-based, and/or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and is coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, and a camera capturing and saving an image.

Figure 2:
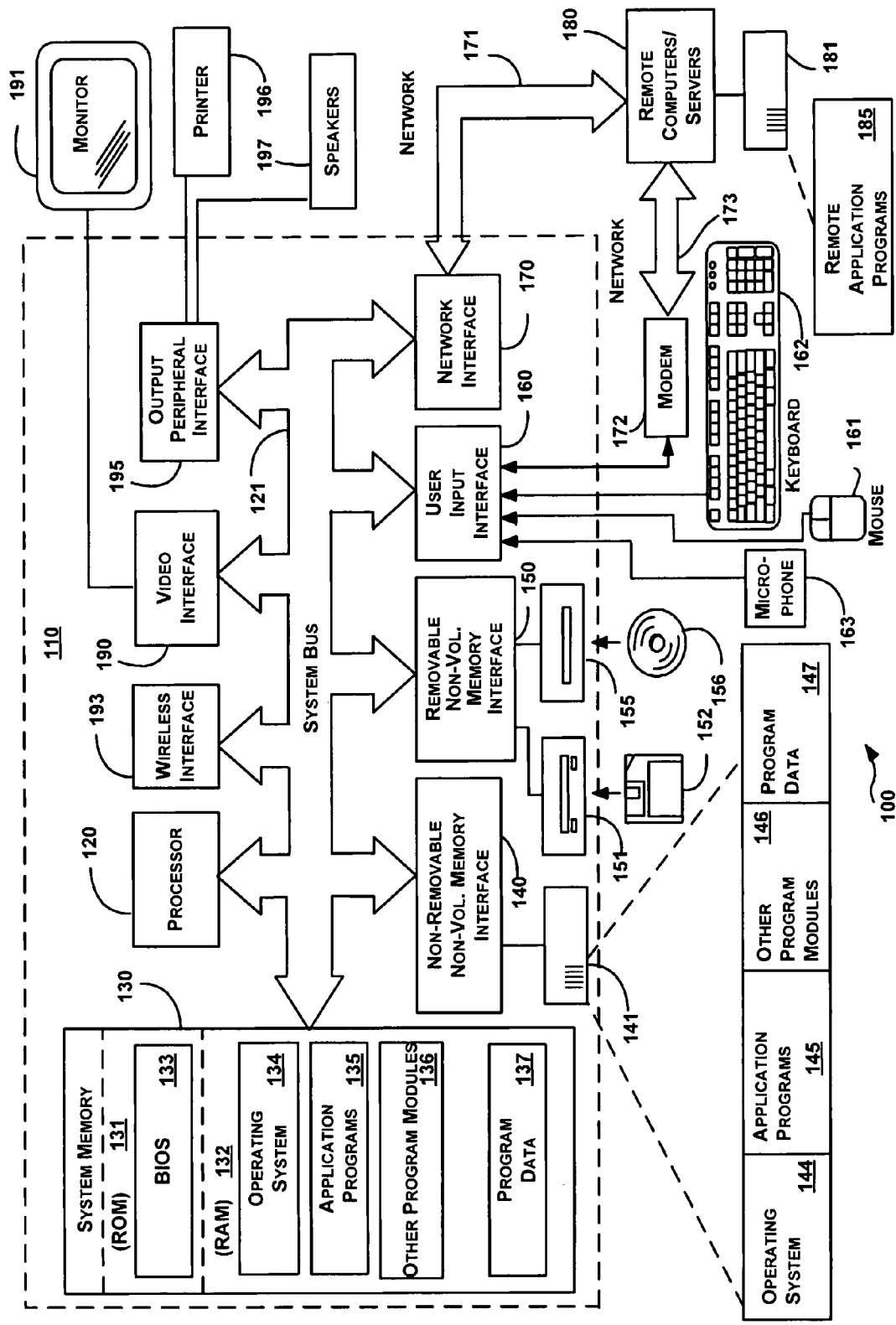
FIG. 2 illustrates an exemplary embodiment of a general-purpose computing system in which embodiments may be implemented.

FIG. 2 illustrates an exemplary embodiment of a general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, and/or atomic quantum memory. Combinations of any of the above may also be included within the scope of computer-readable media.

Communications media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, and/or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, and/or is coupled to an optical disk drive 155 that reads from and writes to a removable, non-volatile optical disk 156, such as a CD ROM. Other removable/nonremovable, volatile/non-volatile computer storage media that can be used in the exemplary operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, and/or the wireless interface 193. The network may include a LAN network environment, and/or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on computer storage medium 181. It will be appreciated that the network connections shown are exemplary and other means of establishing communications link between the computers may be used.

Figure 3:
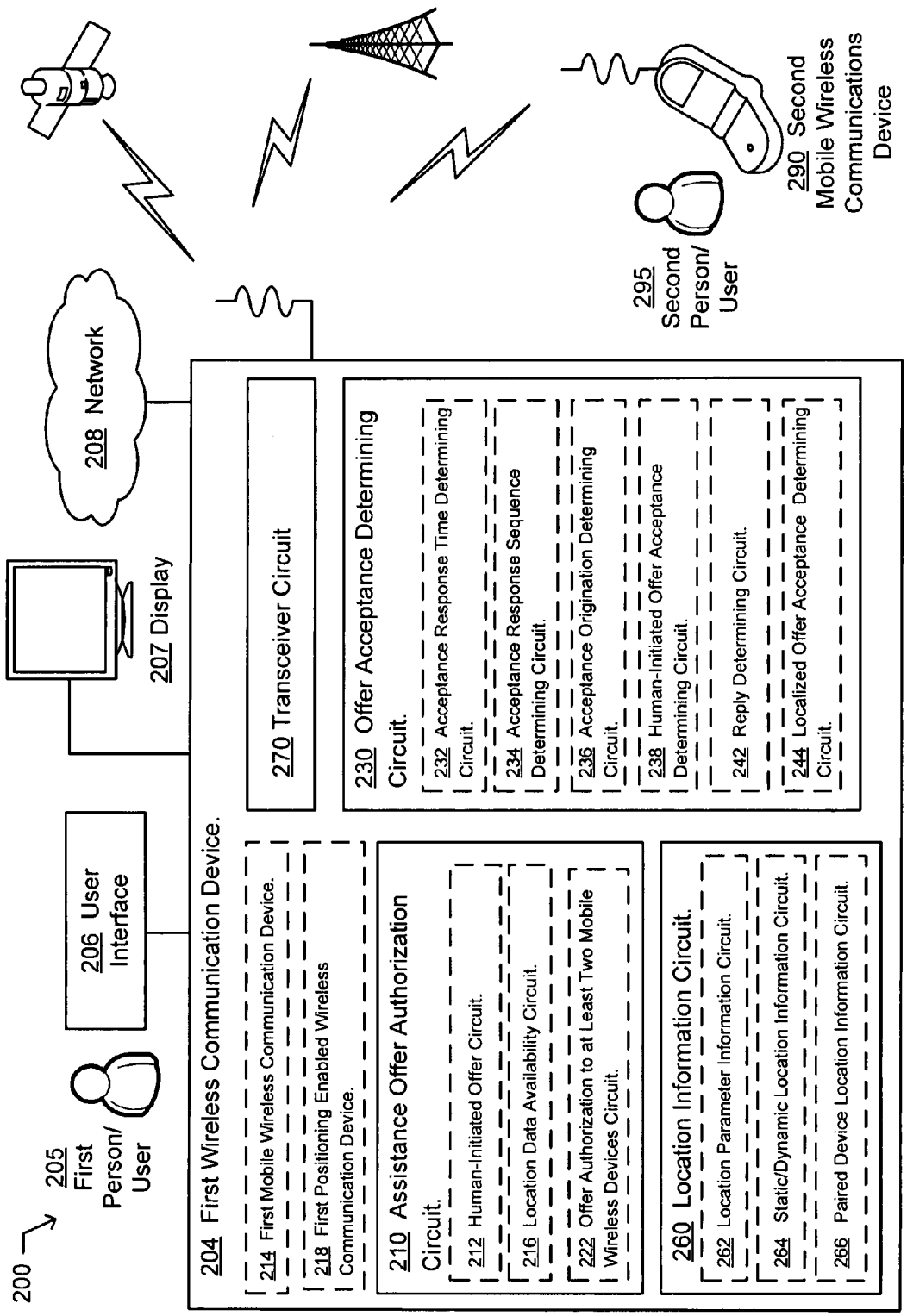
FIG. 3 illustrates an exemplary system in which embodiments may be implemented.

FIG. 3 illustrates an example system 200 in which embodiments may be implemented. The example system includes a first wireless communications device 204, a user interface 206, a display 207, and wireless access to at least one other wireless communication device, illustrated as a second mobile wireless mobile communications device 290. The user interface may be physically incorporated with the device, or may be physically separate from the device and electronically coupled with the device. The display 207 may be physically incorporated with the device, or may be physically separate from the device and electronically coupled with the device. In an alternative embodiment, the device is also coupled to a network 208 via a wireless link, a satellite link, and/or a wired link.

In an embodiment, the first wireless communications device 204 includes a navigation assistance offer authorization circuit 210, an offer acceptance determining circuit 230, and a location information circuit 260. In some embodiments, one or more of the navigation assistance offer authorization circuit, the offer acceptance determining circuit, and/or the location information circuit may be structurally distinct from the remaining circuits. In an embodiment, the device or a portion of the device may be implemented in whole or in part using the thin computing device 20 described in conjunction with FIG. 1 and/or the computing device 110 described in conjunction with FIG. 2. In another embodiment, the device or a portion of the device may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware. A person 205 may via a user interface 206 use the device 204.

The first wireless communication device 204 may include at least one additional circuit. The at least one additional circuit may include a transceiver circuit 270. In addition, the first wireless communication device may include a processor (not illustrated), such as the processing unit 21 described in conjunction with FIG. 1, and/or the processor 120 described in conjunction with FIG. 2. In further addition, the first wireless communications unit may include a computer storage media (not illustrated). In an embodiment, the first wireless communication device may include a mobile wireless communication device 214, and/or a positioning enabled wireless communication device 218.

In an embodiment, the navigation assistance offer authorization circuit 210 may include at least one additional circuit. The at least one additional circuit may include a human-initiated offer circuit 212, a location data availability circuit 216, and/or an offer authorization to at least two mobile wireless devices circuit 222.

In another embodiment, the offer acceptance determining circuit 230 may include at least one additional circuit. The at least one additional circuit may include an acceptance response time determining circuit 232, an acceptance response sequence determining circuit 234, an acceptance origination determining circuit 236, a human-initiated offer acceptance determining circuit 238, a reply determining circuit 242, and/or localized offer acceptance determining circuit 244.

In a further embodiment, the location information circuit 260 may include at least one additional circuit. The at least one additional circuit may include a location parameter information circuit 262, a static/dynamic location information circuit 264, and/or a paired device location information circuit 266.

Figure 4:
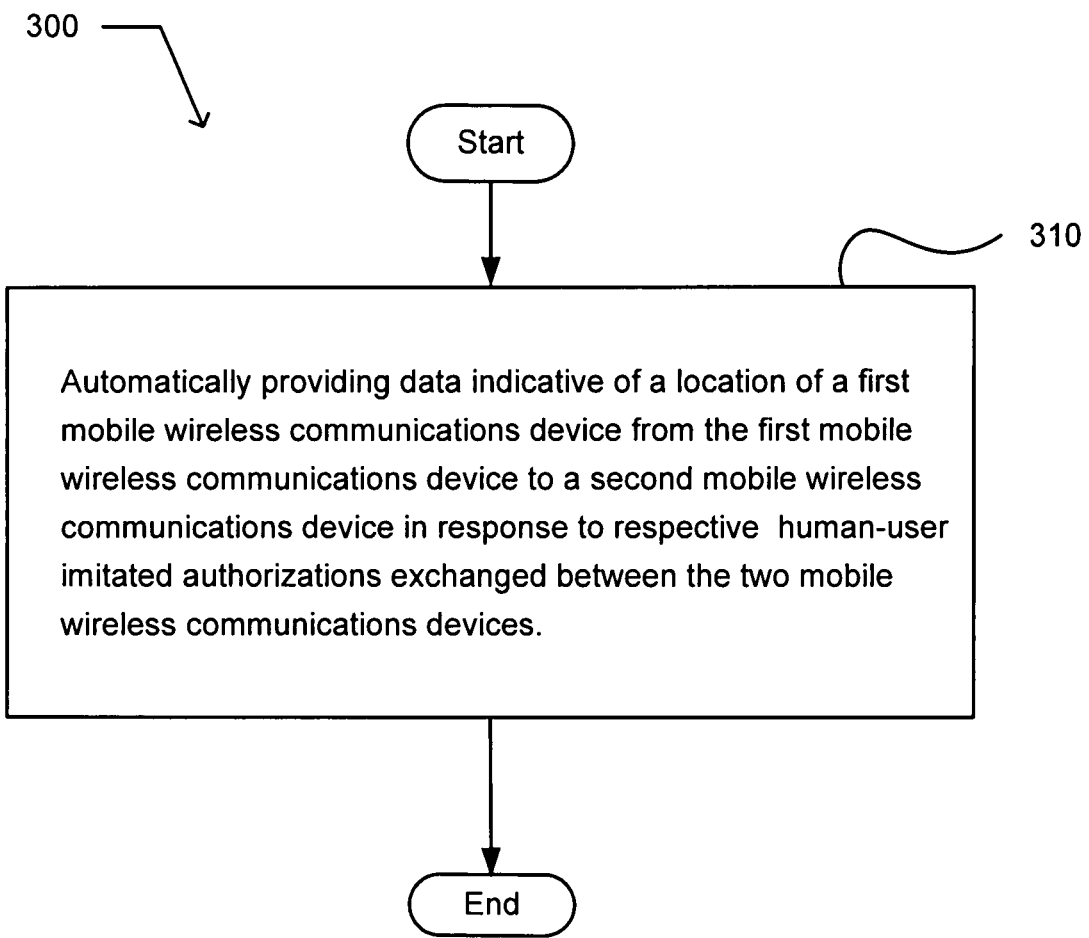
FIG. 4 illustrates an example of an operational flow.

FIG. 4 illustrates an example of an operational flow 300. FIG. 4 and several following figures may include various examples of operational flows, discussions, and explanations with respect to the above-described system 200 of FIG. 3, and/or with respect to other examples and contexts. However, it should be understood that the operational flows may be executed in a number of other environments and contexts, and/or in modified versions of FIG. 3. Also, although the various operational flows are illustrated in a sequence(s), it should be understood that the various operations may be performed in other orders than those which are illustrated, and/or may be performed concurrently.

After a start operation, the operational flow 300 includes automatically providing data indicative of a location of a first mobile wireless communications device from the first mobile wireless communications device to a second mobile wireless communications device in response to respective human-user imitated authorizations exchanged between the two mobile wireless communications devices. The operational flow then moves to an end operation.

In an alternative embodiment, the automatically providing data indicative of a location of a first mobile wireless communications device includes automatically and continuously providing for a period of time data indicative of a location of a first mobile wireless communications device. The period of time may include a fixed period of time, such as one hour, twelve hours, twenty-four, or some other measure of time. The period of time may include a determined time or a calculated time. For example, a determined time may include a time during which the location of the first mobile wireless communication device has not significantly changed, such as no significant location change for more than two hours. A calculated time may include a time when the first mobile wireless communication device and the second mobile wireless communication device have been within a 30-foot radius of each other for more than one hour. Upon the end of the period of time, the providing data indicative of a location of a first mobile wireless communications device ends.

In an embodiment, the automatically providing data indicative of a location of a first mobile wireless communications device may be implemented using the location information circuit 260 of FIG. 3. In another embodiment, the first mobile wireless communications device may be implemented using the first mobile wireless communications device 214. A first human-user initiated authorization may be implemented by the first person/user 205 providing an authorization input to the user interface 206, and by the navigation assistance offer authorization circuit 210 transmitting an offer of navigation assistance via the transceiver circuit 270 in a format and manner receivable by the second mobile wireless communications device 290. A second human-user initiated authorization may be implemented by the second person/user 295 providing an authorization input to a user interface (not shown) of the second mobile wireless communications device, and by the offer being transmitted by the second mobile wireless communications device in a format and manner receivable by the first wireless communications device 204. In an alternative embodiment, the respective human-user imitated authorizations exchanged between the two mobile wireless communications devices are exchanged contemporaneously. For example, in an embodiment, contemporaneously includes the first wireless communications device 204 and the second mobile wireless communications device 290 exchanging the respective human-user imitated authorizations within a five-minute window of time. In another embodiment, contemporaneously includes the first wireless communications device 204 and the second mobile wireless communications device 290 exchanging the respective human-user imitated authorizations within less than a one-minute window of time. In a further embodiment, contemporaneously includes the first wireless communications device 204 and the second mobile wireless communications device 290 exchanging the respective human-user imitated authorizations by a physical touching of the devices together. For example, the physical touching may include the second person/user holding the second mobile wireless communication device in their hand, and touching the second mobile wireless communication device to the first wireless communication device. In another example, both the first wireless communications device and the second mobile wireless communication may be handheld by their respective users and touched together.

FIG. 5 illustrates an example of an operational flow 400 performed in a first wireless communication device. FIG. 5 and several following figures may include various examples of operational flows, discussions, and explanations with respect to the above-described system 200 of FIG. 3, and/or with respect to other examples and contexts. However, it should be understood that the operational flows may be executed in a number of other environments and contexts, and/or in modified versions of FIG. 3. Also, although the various operational flows are illustrated in a sequence(s), it should be understood that the various operations may be performed in other orders than those which are illustrated, and/or may be performed concurrently.

After a start operation, the operational flow 400 includes an assistance offer operation 410. The assistance offer operation includes transmitting an offer to provide data indicative of a location of the first wireless communications device to a second mobile wireless communication device. In an embodiment, the first wireless communications device includes a stationary, a mobile, handheld, and/or vehicle borne first wireless communications device. In another embodiment, the second mobile wireless communications device includes a handheld, and/or vehicle borne first wireless communications device. The assistance offer operation may be implemented using the assistance offer authorization circuit 210 of FIG. 3. An authorization operation 430 receives a communication originated by the second mobile wireless communication device accepting the offer to provide data indicative of a location of the first wireless communication device. The authorization operation may be implemented using the offer acceptance determining circuit 230 of FIG. 3. A navigation assistance operation 460 transmits data indicative of a location of the first wireless communication device. The transmitted data is useable by the second mobile wireless communication device in determining a spatial relationship between the location of the first wireless communication device and a location of the second mobile wireless communication device. The navigation assistance operation may be implemented using the location information circuit 260 of FIG. 3. The operational flow then proceeds to an end operation.

FIG. 6 illustrates an alternative embodiment of the operational flow 400 described in conjunction with FIG. 5. The navigation assistance offer operation 410 may include at least one additional operation. The at least one additional operation may include an operation 412, an operation 414, an operation 416, an operation 418, and/or an operation 422. The operation 412 transmits in response to an authorization input received from a human user of the first wireless communication device an offer to provide data indicative of a location of the first wireless communications device to a second mobile wireless communication device. The operation 412 may be implemented using the human-initiated offer circuit 212 of FIG. 3. The operation 414 transmits from a first mobile wireless communications device an offer to provide data indicative of a location of the first mobile wireless communications device to a second mobile wireless communication device. The operation 414 may be implemented using the first mobile wireless communication device 214 of FIG. 3. The operation 416 transmits from a first wireless communications device an indication of availability to provide data indicative of a location of the first wireless communications device to a second mobile wireless communication device. The operation 416 may be implemented using the location data availability circuit 216 of FIG. 3.

The operation 418 transmits from a first positioning-enabled wireless communications device an offer to provide data indicative of a location of the first wireless communications device to a second mobile wireless communication device. In an embodiment, a positioning-enabled wireless communications device includes a communications device operable to at least one of know, determine, or receive from another source its position. For example, in an embodiment, a positioning-enabled wireless communications device is operable to obtain its position from a global positioning satellite system. In another embodiment, a positioning-enabled wireless communications device is operable to obtain its position from information obtained from its host network, such as a cell phone network operator. In a further embodiment, a positioning-enabled wireless communications device is operable to receive its position from its host network, such as a cell phone network operator. The operation 418 may be implemented using the first positioning-enabled wireless communication device 218 of FIG. 3.

The operation 422 transmits an offer to provide data indicative of a location of the first wireless communications device to a second mobile wireless communication device and to a third mobile wireless communications device. The operation 422 may be implemented using the offer authorization to at least two wireless devices circuit 222 of FIG. 3.

Figure 7:
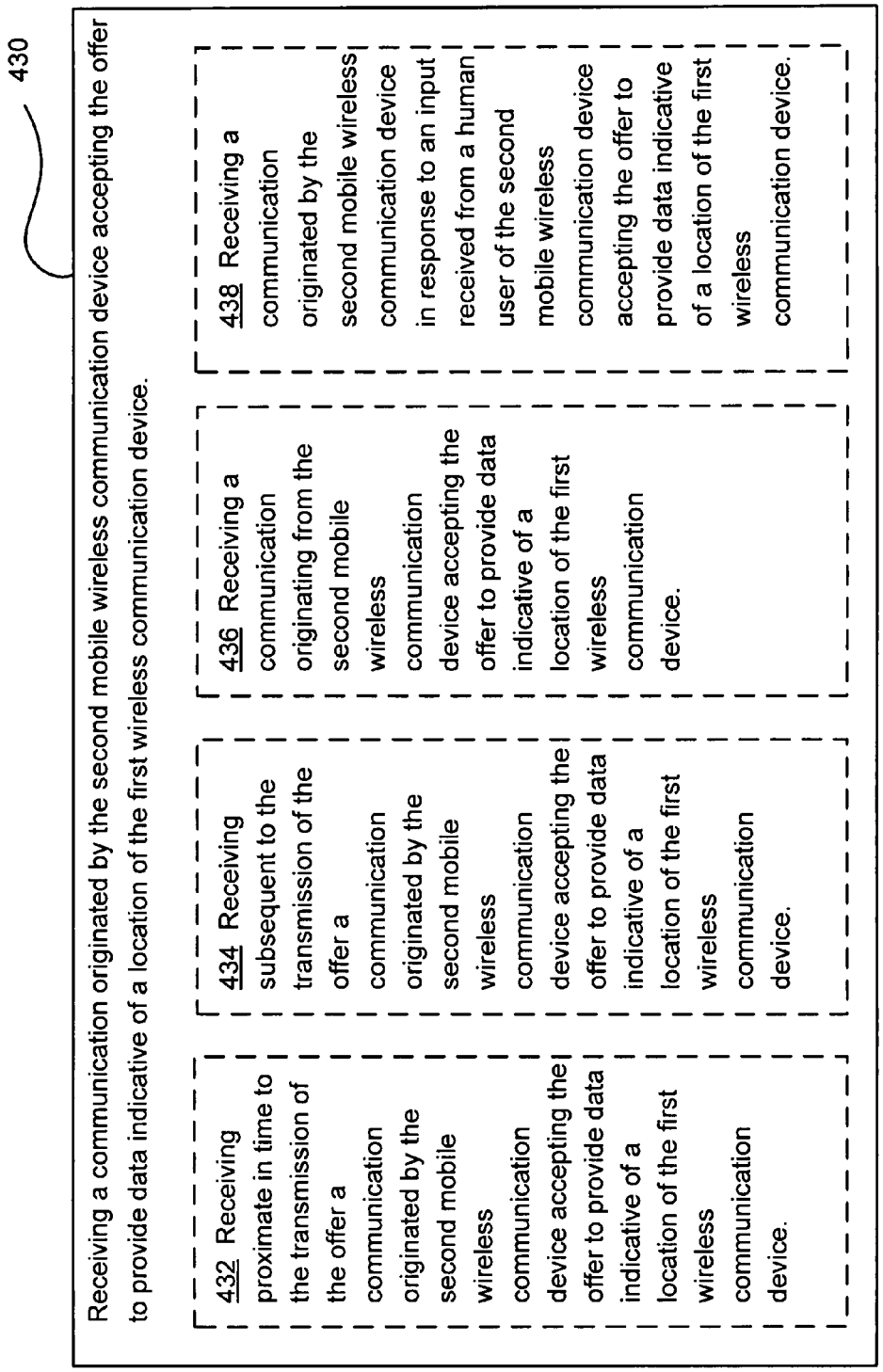
FIG. 7 illustrates another alternative embodiment of the operational flow described in conjunction with FIG. 5.

FIG. 7 illustrates another alternative embodiment of the operational flow 400 described in conjunction with FIG. 5. The authorization operation 430 may include at least one additional operation. The at least one additional operation may include an operation 432, an operation 434, an operation 436, and/or an operation 438. The operation 432 receives, proximate in time to the transmission of the offer, a communication originated by the second mobile wireless communication device accepting the offer to provide data indicative of a location of the first wireless communication device. In an embodiment, proximate in time includes close in time. For example, close in time includes separated by seconds, or minutes. The operation 432 may be implemented using the acceptance response time determining circuit 232 of FIG. 3. The operation 434 receives, subsequent to the transmission of the offer, a communication originated by the second mobile wireless communication device accepting the offer to provide data indicative of a location of the first wireless communication device. The operation 434 may be implemented using the acceptance response sequence determining circuit 234. The operation 436 receives a communication originating from the second mobile wireless communication device accepting the offer to provide data indicative of a location of the first wireless communication device. The operation 436 may be implemented using the acceptance origination determination circuit 236. The operation 438 receives a communication originated by the second mobile wireless communication device in response to an input received from a human user of the second mobile wireless communication device accepting the offer to provide data indicative of a location of the first wireless communication device. The operation 438 may be implemented using the human-initiated offer acceptance determination circuit 238.

Figure 8:
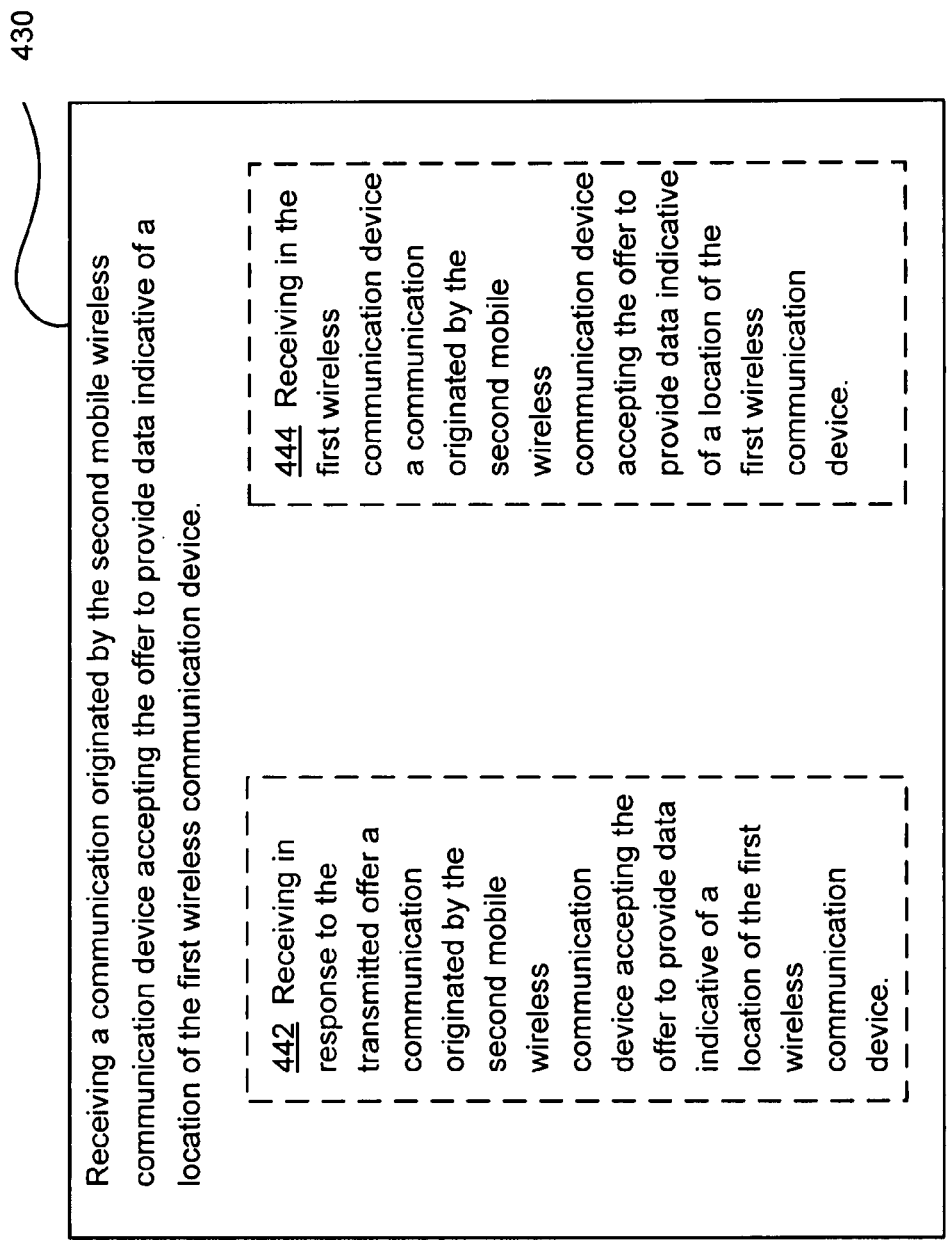
FIG. 8 illustrates a further alternative embodiment of the operational flow described in conjunction with FIG. 5.

FIG. 8 illustrates a further alternative embodiment of the operational flow 400 described in conjunction with FIG. 5. The authorization operation 430 may include at least one additional operation. The at least one additional operation may include an operation 442, and/or an operation 444. The operation 442 receives, in response to the transmitting the offer, a communication originated by the second mobile wireless communication device accepting the offer to provide data indicative of a location of the first wireless communication device. The operation 442 may be implemented using the reply determining circuit 242. The operation 444 receives in the first wireless communication device a communication originated by the second mobile wireless communication device accepting the offer to provide data indicative of a location of the first wireless communication device. The operation 444 may be implemented using the localized offer acceptance determination circuit 244.

FIG. 9 illustrates an alternative embodiment of the operational flow 400 described in conjunction with FIG. 5. The navigation assistance operation 460 may include at least one additional operation. The at least one additional operation may include an operation 462, an operation 464, an operation 466, an operation 468, and/or an operation 472. The operation 462 transmits data indicative of a position, a route, a speed, and/or a direction of the first wireless communication device. The operation 462 may be implemented using the location parameter information circuit 262 of FIG. 3. The operation 464 transmits data indicative of an at least substantially stationary location, or a moving location of the first wireless communication device. The operation 464 may be implemented using the static/dynamic location information circuit 264. The operation 466 transmits data indicative of a location of the first wireless communication device. The transmitted data is useable by the second mobile wireless communication device in displaying information indicative of a spatial relationship between the location of the first wireless communication device and a location of the second mobile wireless communication device. For example, the displaying information may include at least one of visually displaying the information or audibly displaying the information. The operation 466 may be implemented using the paired device location information circuit 266. The operation 468 transmits data indicative of a location of the first wireless communication device. The transmitted data being useable by the second wireless communication device in generating information usable in directing at least one of a person, vehicle, craft, or plane associated with the second mobile wireless communication device to a location proximate to the location of the first wireless communication device. The operation 468 may be implemented using the paired device location information circuit 266. The operation 472 transmits data indicative of a location of the first wireless communication device. The transmitted data is useable by the second wireless communication device in generating information usable in directing at least one of a person, vehicle, craft, or plane associated with the second mobile wireless communication device to the location of the first wireless communication device. For example, the information usable in directing at least one of a person, vehicle, craft, or plane associated with the second mobile wireless communication device may include a map indicating relative positions of both, a route, or directions. The operation 472 may be implemented using the paired device location information circuit 266.

FIG. 10 illustrates another alternative embodiment of the operational flow 400 described in conjunction with FIG. 5. The navigation assistance operation 460 may include at least one additional operation. The at least one additional operation may include an operation 474. The operation 474 transmits data indicative of a location of the first wireless communication device for a limited time.

Figure 11:
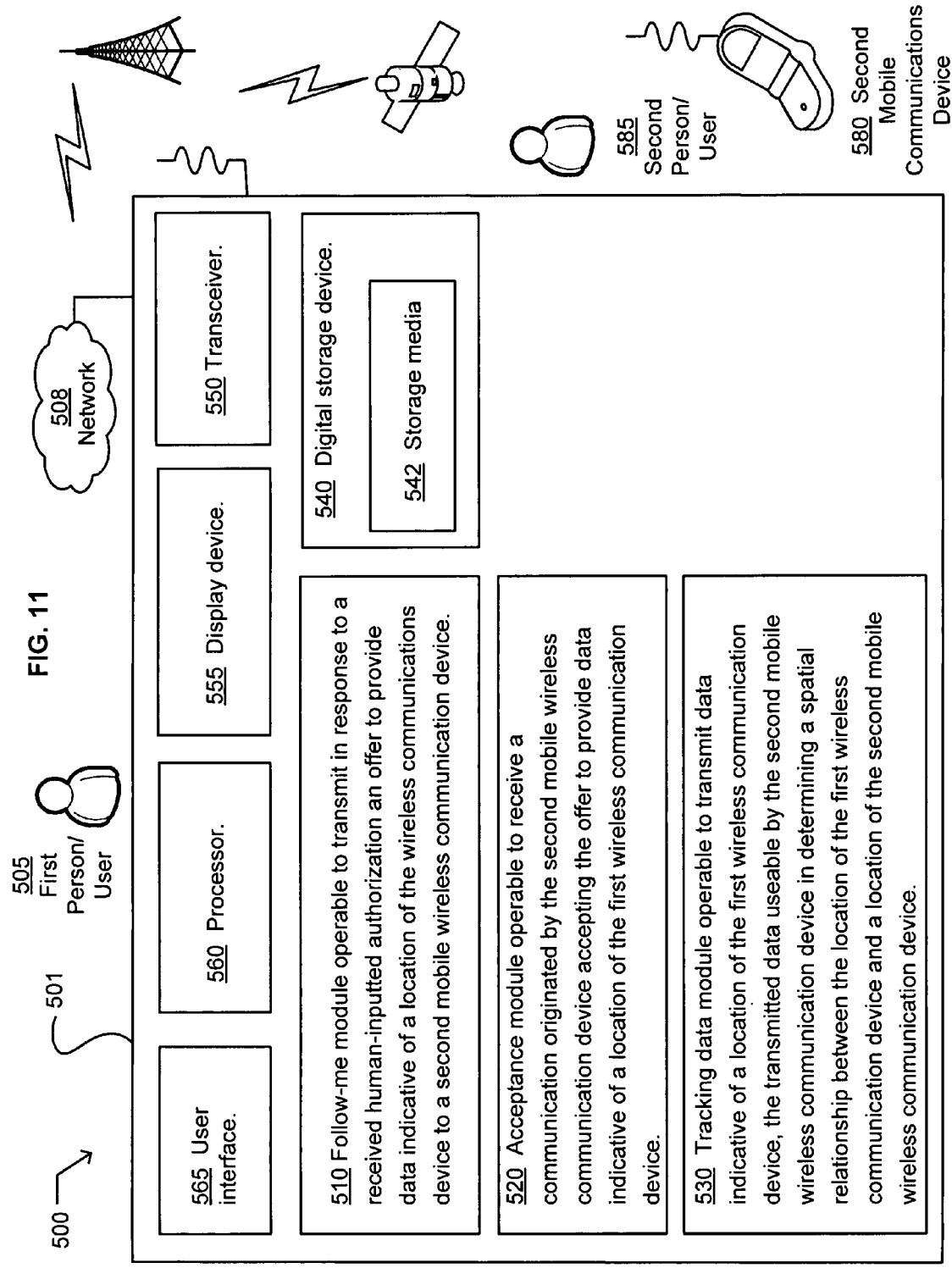
FIG. 11 illustrates an example system.

FIG. 11 illustrates an example system 500. The system includes a first wireless communication device 501 that includes a follow-me module 510, an acceptance module 520, and a tracking module 530. In an embodiment, the wireless communication device may include at least one of a digital storage device 540, a transceiver 550, a display device 555, a processor 560, or a user interface 565.

The follow-me module 510 includes a follow-me module operable to transmit in response to a received human-inputted authorization an offer to provide data indicative of a location of the wireless communications device 501 to a second mobile wireless communication device 580. In an embodiment, the received human-inputted authorization includes receiving an inputted authorization by a first person/user 505 via a user interface 565. The acceptance module 520 is operable to receive a communication originated by the second mobile wireless communication device accepting the offer to provide data indicative of a location of the first wireless communication device. The tracking data module 530 includes a tracking data module operable to transmit data indicative of a location of the first wireless communication device. The transmitted data is useable by the second mobile wireless communication device in determining a spatial relationship between the location of the first wireless communication device and a location of the second mobile wireless communication device. In an alternative embodiment, the tracking data module includes a tracking data module operable to transmit data indicative of changes in location of the first wireless communication device. In an embodiment, the digital storage device 540 includes computer storage media, such as the computer storage media described in conjunction with FIG. 2.

Figure 12:
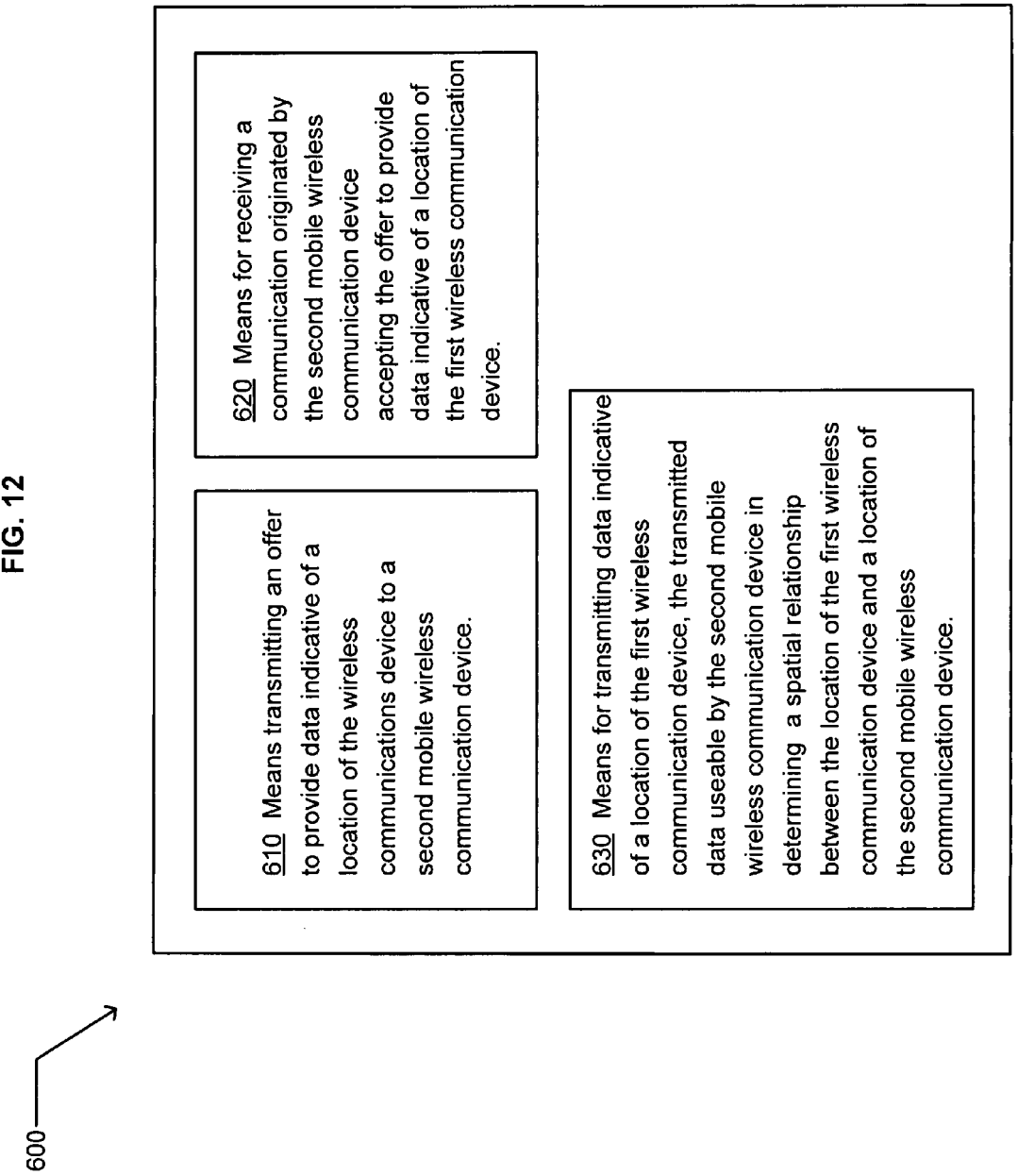
FIG. 12 illustrates an example wireless communications apparatus.

FIG. 12 illustrates an example wireless communications apparatus 600. The apparatus includes means 610 for transmitting an offer to provide data indicative of a location of the wireless communications device to a second mobile wireless communication device. The apparatus also include means 620 for receiving a communication originated by the second mobile wireless communication device accepting the offer to provide data indicative of a location of the first wireless communication device. The apparatus further includes means 630 for transmitting data indicative of a location of the first wireless communication device. The transmitted data is useable by the second mobile wireless communication device in determining a spatial relationship between the location of the first wireless communication device and a location of the second mobile wireless communication device.

Figure 13:
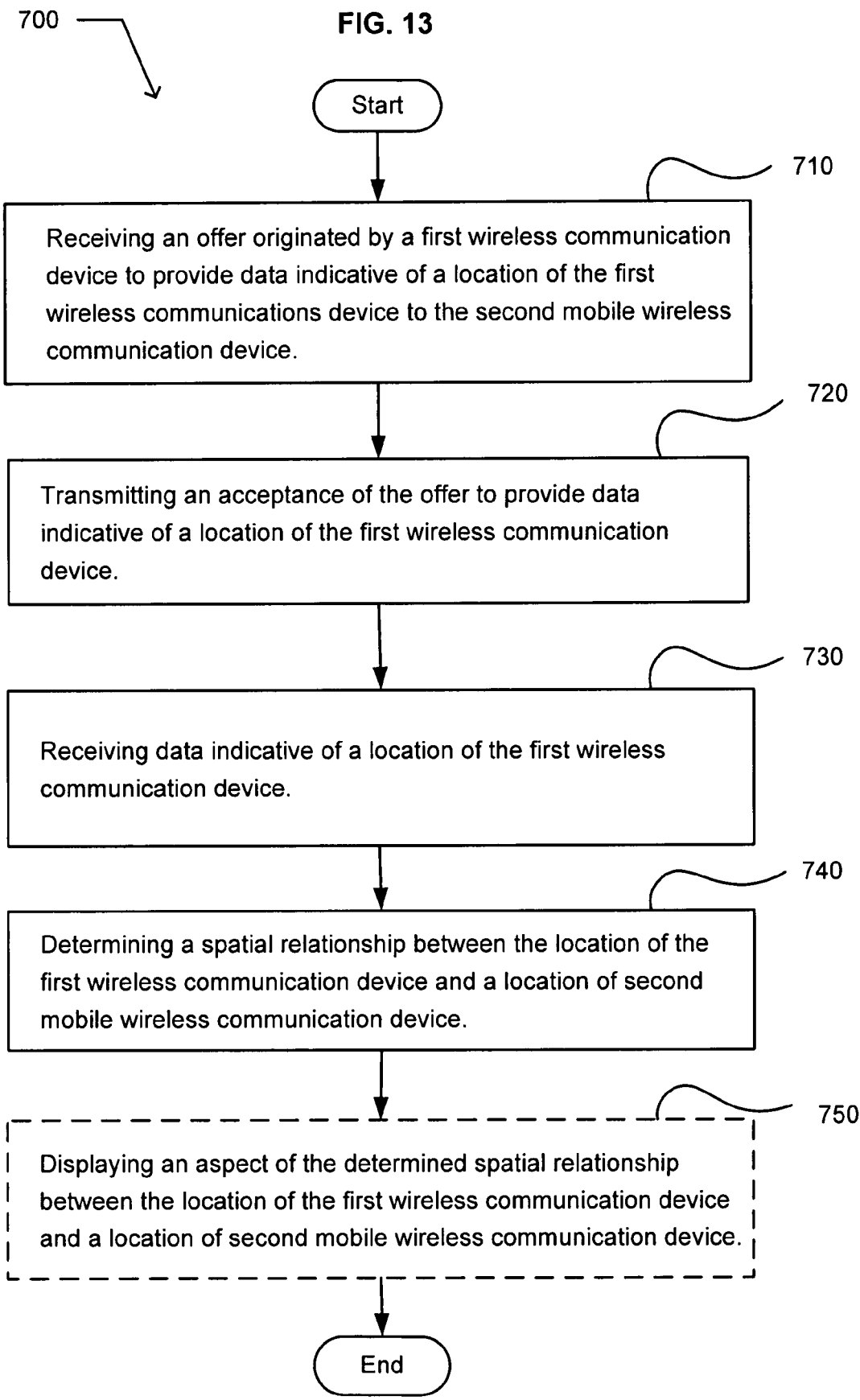
FIG. 13 illustrates an example operational flow implemented in a second wireless mobile communications device.

FIG. 13 illustrates an example operational flow 700 implemented in a second wireless mobile communications device. After a start operation, the operational flow moves to a reception operation 710. The reception operation receives an offer originated by a first wireless communication device to provide data indicative of a location of the first wireless communications device to the second mobile wireless communication device. In an embodiment, the first wireless communication device may include at least one of a stationary, a mobile, handheld, or vehicle borne wireless communication device. In another embodiment, the second mobile wireless communication device may include at least one of a handheld, or vehicle borne mobile wireless communication device. A response operation 720 transmits an acceptance of the offer to provide data indicative of a location of the first wireless communication device. An acquisition operation 730 receives data indicative of a location of the first wireless communication device. In an alternative embodiment, the data indicative of a location of the first wireless communications device includes data originated by the first wireless communication device. In another alternative embodiment, the data indicative of a location of the first wireless communications device includes data originated by a network host for the first wireless communication device, such as a cell phone provider. A navigation operation 740 determines a spatial relationship between the location of the first wireless communication device and a location of the second mobile wireless communication device. The operational flow then moves to an end operation.

In an alternative embodiment, the operational flow 700 may include at least one additional operation, such as a user-assistance operation 750. The user-assistance operation displays an aspect of the determined spatial relationship between the location of the first wireless communication device and a location of the second mobile wireless communication device.

Figure 14:
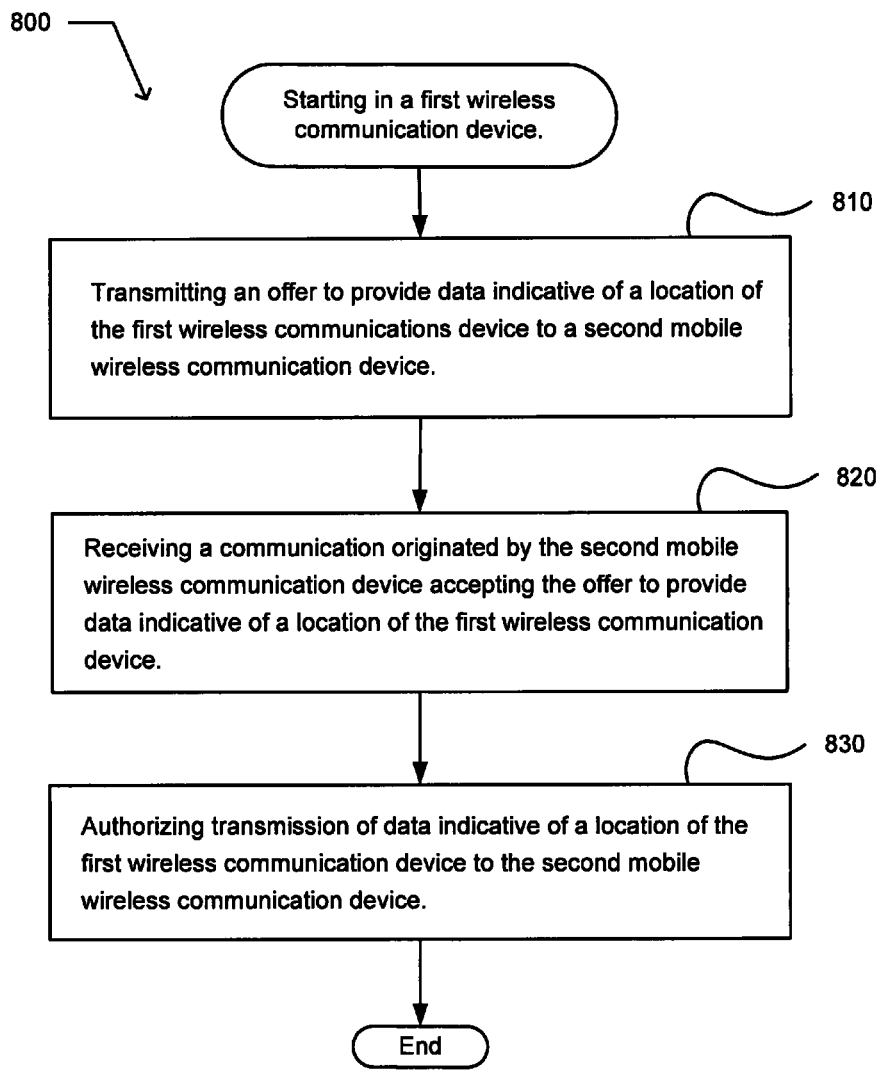
FIG. 14 illustrates an example operational flow performed in a first wireless communication device.

FIG. 14 illustrates an example operational flow 800 performed in a first wireless communication device. After a start operation performed in a first wireless communication device, the operational flow includes an availability announcement operation 810. The availability announcement operation transmits an offer to provide data indicative of a location of the first wireless communications device to a second mobile wireless communication device. A pairing operation 820 receives a communication originated by the second mobile wireless communication device accepting the offer to provide data indicative of a location of the first wireless communication device. An assistance operation 830 authorizes transmission of data indicative of a location of the first wireless communication device to the second mobile wireless communication device. For example, in an embodiment, the transmission of data indicative of a location of the first wireless communication device may be sourced from at least one of the first mobile wireless communication device, or a cellular communications network provider. The operational flow then moves to an end operation.

Figure 15:
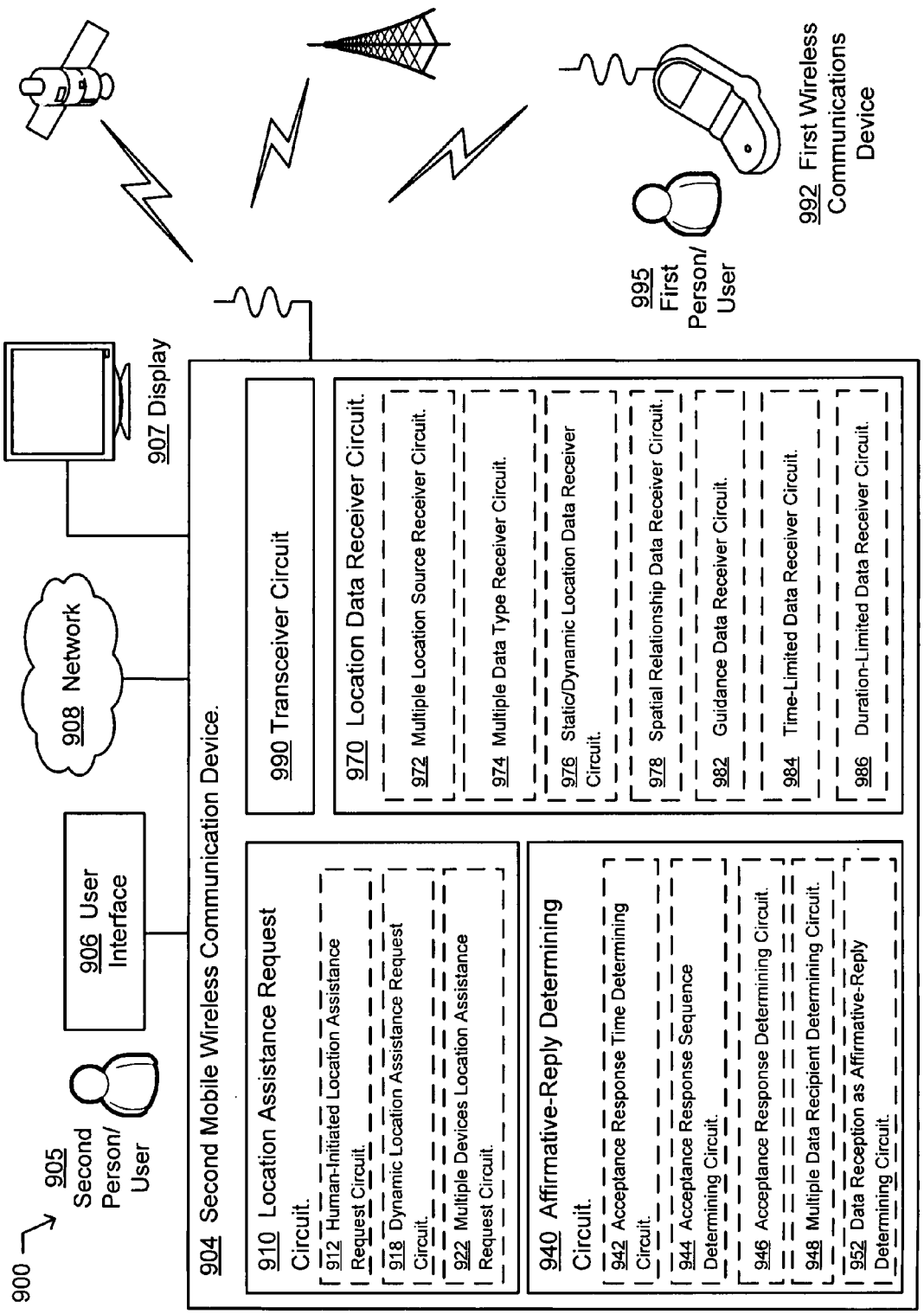
FIG. 15 illustrates an example system in which embodiments may be implemented.

FIG. 15 illustrates an example system 900 in which embodiments may be implemented. The example system includes a second mobile wireless communications device 904, a user interface 906, a display 907, and wireless access to at least one other wireless communication device, illustrated as a first mobile wireless mobile communications device 992. The user interface may be physically incorporated with the second mobile wireless communications device, or may be physically separate from and electronically coupled with the second mobile wireless communications device. The display 907 may be physically incorporated with the second mobile wireless communications device, or may be physically separate from the second mobile wireless communications device and electronically coupled therewith. In an alternative embodiment, the second mobile wireless communications device is also coupled to a network 908 via a wireless link, a satellite link, and/or a wired link.

In an embodiment, the second mobile wireless communications device 904 includes a location assistance request circuit 910, an affirmative-reply determining circuit 940, and a location data receiver circuit 970. In some embodiments, one or more of the location assistance request circuit, the affirmative-reply determining circuit, and a location data receiver circuit may be structurally distinct from the remaining circuits. In an embodiment, the second mobile wireless communications device or a portion thereof may be implemented in whole or in part using the thin computing device 20 described in conjunction with FIG. 1, and/or the computing device 110 described in conjunction with FIG. 2. In another embodiment, the second mobile wireless communications device or a portion thereof may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware. A second person 905 may via a user interface 906 to interact with and/or use the second mobile wireless communications device.

The second mobile wireless communications device 904 may include at least one additional circuit. The at least one additional circuit may include a transceiver circuit 990. In addition, the first wireless communication device may include a processor (not illustrated), such as the processing unit 21 described in conjunction with FIG. 1, and/or the processor 120 described in conjunction with FIG. 2. In further addition, the first wireless communications unit may include a computer storage media (not illustrated). In an embodiment, the second mobile wireless communications device may include a positioning-enabled wireless communication device.

In an embodiment, the location assistance request circuit 910 may include at least one additional circuit. The at least one additional circuit may include a human-initiated location assistance request circuit 912, a dynamic location assistance request circuit 918, and/or a multiple devices location assistance request circuit 922. In another embodiment, the affirmative-reply determining circuit 940 may include at least one additional circuit. The at least one additional circuit may include an acceptance response time determining circuit 942, an acceptance response sequence determining circuit 944, an acceptance response determining circuit 946, a multiple data recipient determining circuit 948, and/or a data reception circuit as affirmative-reply determining circuit 952. In a further embodiment, the location data receiver circuit 970 may include at least one additional circuit. The at least one additional circuit may include a multiple location data source receiver circuit 972, a multiple location data type receiver 974, a static/dynamic location information receiver circuit 976, a spatial relationship data receiver circuit 978, a guidance data receiver circuit 982, a time-limited data receiver circuit 984, and/or a duration limited data receiver circuit 986.

Figure 16:
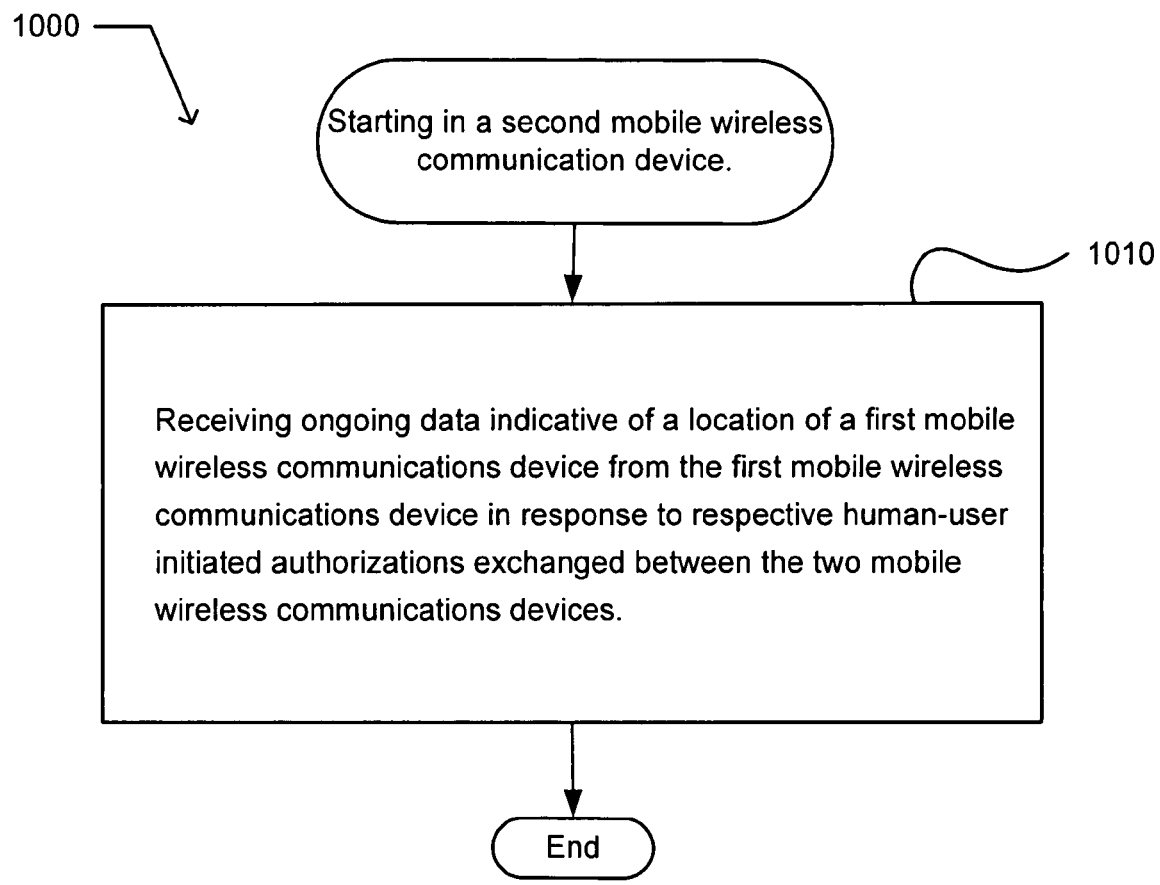
FIG. 16 illustrates an example of an operational flow.

FIG. 16 illustrates an example of an operational flow 1000. FIG. 16 and several following figures may include various examples of operational flows, discussions, and explanations with respect to the above-described system 900 of FIG. 15, and/or with respect to other examples and contexts. However, it should be understood that the operational flows may be executed in a number of other environments and contexts, and/or in modified versions of FIG. 15. Also, although the various operational flows are illustrated in a sequence(s), it should be understood that the various operations may be performed in other orders than those which are illustrated, and/or may be performed concurrently.

After a start operation in a second mobile wireless communication device, the operational flow 1010 receives ongoing data indicative of a location of a first mobile wireless communications device from the first mobile wireless communications device in response to respective human-user initiated authorizations exchanged between the two mobile wireless communications devices. In an embodiment, the continuous stream of data includes a time-limited continuous stream of data. In a further embodiment, the continuous stream of data includes a duration-limited continuous stream of data. For example, a duration-limited continuous stream of data may include a continuous stream of data limited to positions of the first mobile device within a radius of a starting location, such as a ten-mile radius. In another example, a duration-limited continuous stream of data may include a continuous stream of data limited to positions of the first mobile device within one hundred miles of a starting location. The operational flow then moves to an end operation.

Figure 17:
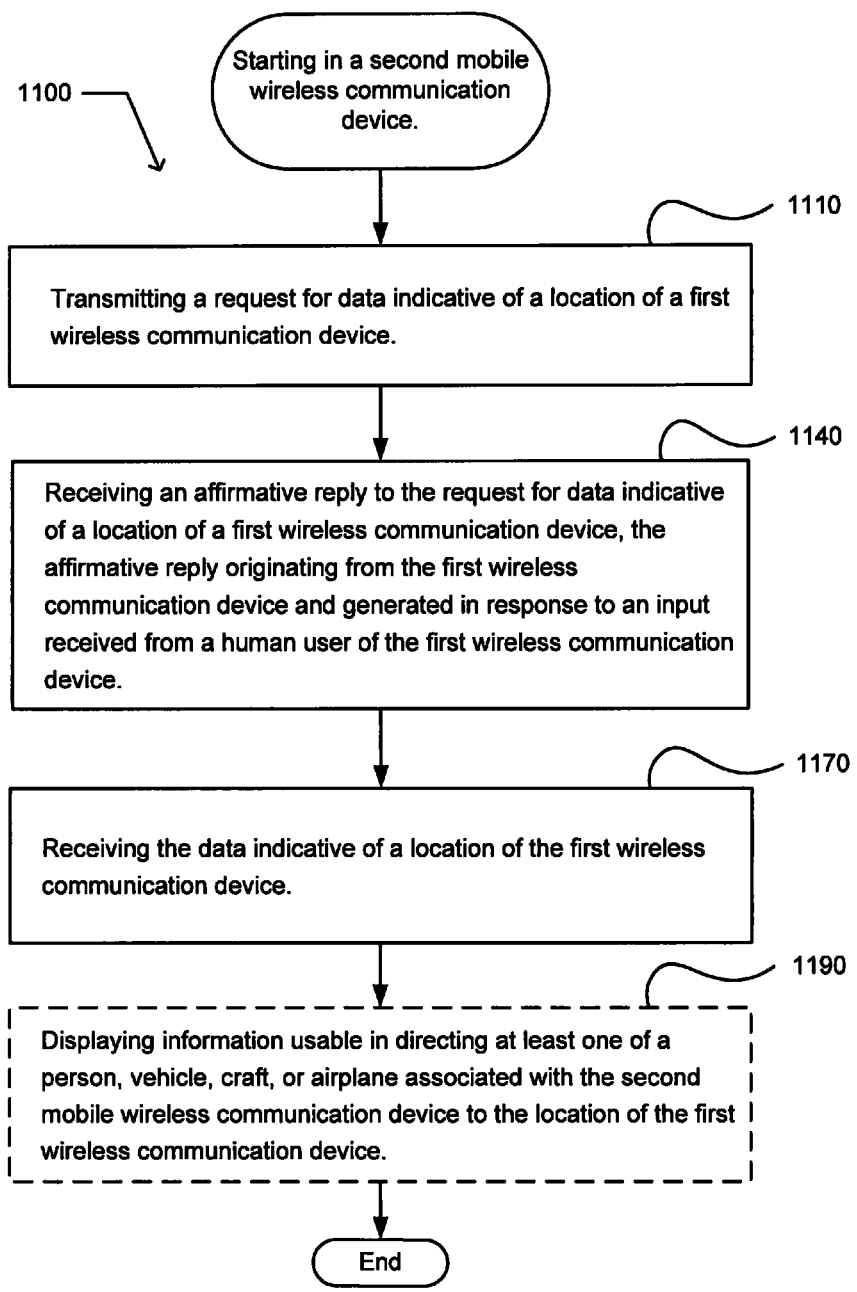
FIG. 17 illustrates an example operational flow.

FIG. 17 illustrates an example operational flow 1100. FIG. 17 and several following figures may include various examples of operational flows, discussions, and explanations with respect to the above-described system 900 of FIG. 15, and/or with respect to other examples and contexts. However, it should be understood that the operational flows may be executed in a number of other environments and contexts, and/or in modified versions of FIG. 15. Also, although the various operational flows are illustrated in a sequence(s), it should be understood that the various operations may be performed in other orders than those which are illustrated, and/or may be performed concurrently.

After a start operation in a second mobile wireless communication device, the operational flow moves to a call operation 1110. The call operation transmits a request for data indicative of a location of a first wireless communication device. In an embodiment, the call operation includes a call operation transmitting a request for at least one of navigation, or tracking assistance data. In another embodiment, the call operation includes a call operation that transmits a request for data indicative of a location of a first wireless communication device in response to an input received from a second human user, such as the second person/user 905 of FIG. 15. In a further embodiment, the second human user includes a human user that is at least one of physically associated with the second mobile wireless communication device, carrying the second mobile wireless communication device, holding the second mobile wireless communication device, or riding in a vehicle bearing the second mobile wireless communication device. The call operation 1110 may be implemented using the location assistance request circuit 910 of FIG. 15.

A pairing operation 1140 receives an affirmative reply to the request for data indicative of a location of a first wireless communication device. The affirmative reply originating from the first wireless communication device and generated in response to an input received from a human user of the first wireless communication device. In an embodiment, the generated in response to an input received from a human user of the first wireless communication device includes generated in response to an authorization input received from a human user of the first wireless communication device. In another embodiment, the first wireless communication device includes a first wireless communication device physically present in a premise. In a further embodiment, the first wireless communication device includes a first wireless communication device 990 associated with a first person/user 995, such as by the first person/user carrying the first wireless communication device, holding the first wireless communication device, or riding in a vehicle having the first wireless communication device. The paring operation may be implemented using the affirmative-reply determining circuit 940 of FIG. 15.

An acquisition operation 1170 receives the data indicative of a location of the first wireless communication device. In an embodiment, the data indicative of a location includes data indicative of at least one of a fixed, stationary, transitory, moving, or in-motion location. The acquisition operation may be implemented using the location data receiver circuit 970 of FIG. 15. The operational flow then moves an end operation.

In an alternative embodiment, the operational flow 1100 may include at least one additional operation, such as an operation 1190. The operation 1190 displays information usable in directing at least one of a person, vehicle, craft, or airplane associated with the second mobile wireless communication device to the location of the first wireless communication device. The operation 1190 may be implemented using the display 907.

FIG. 18 illustrates an alternative embodiment of the operational flow 1100 of FIG. 17. The call operation 1110 may include at least one additional operation. The at least one additional operation may include an operation 1112, an operation 1114, an operation 1116, an operation 1118, or an operation 1122. The operation 1112 transmits a request for data indicative of a location of a first wireless communication device in response to an input received from a human user of the second mobile wireless communication device. The operation 1112 may be implemented using the human-initiated location assistance request circuit 912 of FIG. 15. The human user may include the second person/user 905. The operation 1114 transmits a request for data indicative of a location of a first mobile wireless communication device. An embodiment of the first wireless communication device 992 may include a first mobile wireless communications device. The operation 1116 transmits a request for data indicative of a location of a positioning-enabled first mobile wireless communication device. An embodiment of the first wireless communication device 992 may include a positioning-enabled first mobile wireless communications device. The operation 1118 transmits a request for data indicative of dynamic locations of a first mobile wireless communication device. The operation 1118 may be implemented using the dynamic location assistance request circuit 918. The operation 1122 transmits a request that data indicative of a location of a first wireless communication device be provided to the second mobile wireless communication device and to a third mobile wireless communications device. The operation 1122 may be implemented using the multiple devices location assistance request circuit 922.

FIG. 19 illustrates another embodiment of the operational flow 1100 of FIG. 17. The pairing operation 1140 may include at least one additional operation. The at least one additional operation may include an operation 1142, an operation 1144, or an operation 1146. The operation 1142 receives proximate in time to the transmission of the request an affirmative reply to the request for data indicative of a location of a first wireless communication device. The affirmative input received from a human user of the first wireless communication device. The operation 1142 may be implemented using the acceptance response time determining circuit 942 of FIG. 15. The operation 1144 receives subsequent to the transmission of the request an affirmative reply to the request for data indicative of a location of a first wireless communication device. The affirmative reply originating from the first wireless communication device and generated in response to an input received from a human user of the first wireless communication device. The operation 1144 may be implemented using the acceptance response sequence determining circuit 944. The operation 1146 receives in response to the transmitted request an affirmative reply to the request for data indicative of a location of a first wireless communication device. The affirmative reply originating from the first wireless communication device and generated in response to an input received from a human user of the first wireless communication device. The operation 1146 may be implemented using the acceptance response determining circuit 946.

Figure 20:
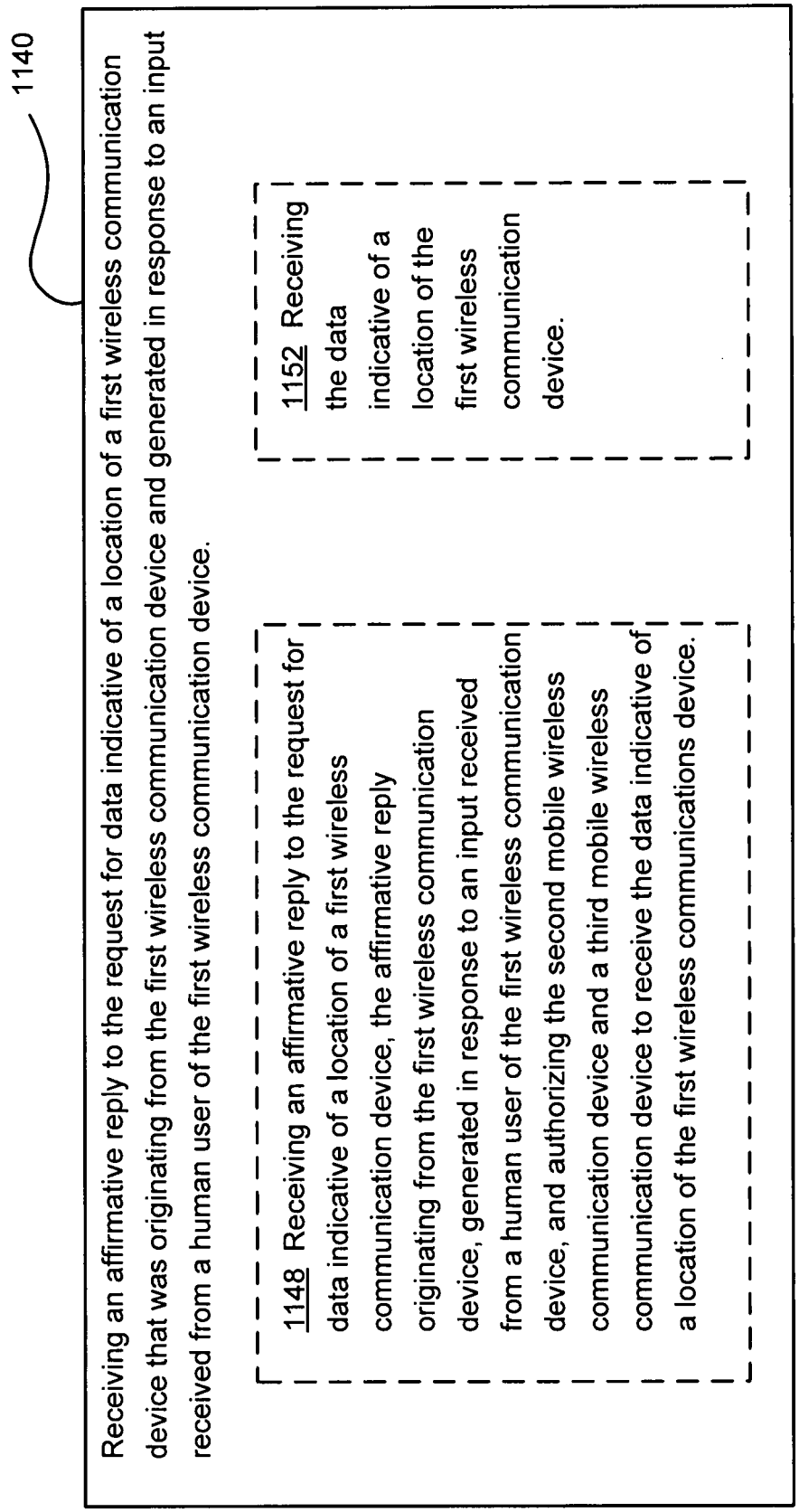
FIG. 20 illustrates a further embodiment of the operational flow of FIG. 17.

FIG. 20 illustrates a further embodiment of the operational flow 1100 of FIG. 17. The pairing operation 1140 may include at least one additional operation. The at least one additional operation may include an operation 1148, or an operation 1152. The operation 1148 receives an affirmative reply to the request for data indicative of a location of a first wireless communication device. The affirmative reply originating from the first wireless communication device, generated in response to an input received from a human user of the first wireless communication device, and authorizing the second mobile wireless communication device and a third mobile wireless communication device to receive the data indicative of a location of the first wireless communications device. The operation 1148 may be implemented using the multiple data recipient determining circuit 948. At the operation 1152, the acquisition operation 1170 receiving the data indicative of a location of a first wireless communication device also constitutes receiving an affirmative reply to the request for data indicative of a location of a first wireless communication device. For example, the operation 1152 allows the pairing operation 1140 to be combined with the acquisition operation 1170 by presuming that the reception of the data indicative of the location of the first wireless communication device was in response to an authorized transmission of that data in response to an input received from human user of the first wireless communication device. The operation 1152 may be implemented using the data reception as affirmative reply determining circuit 952.

Figure 21:
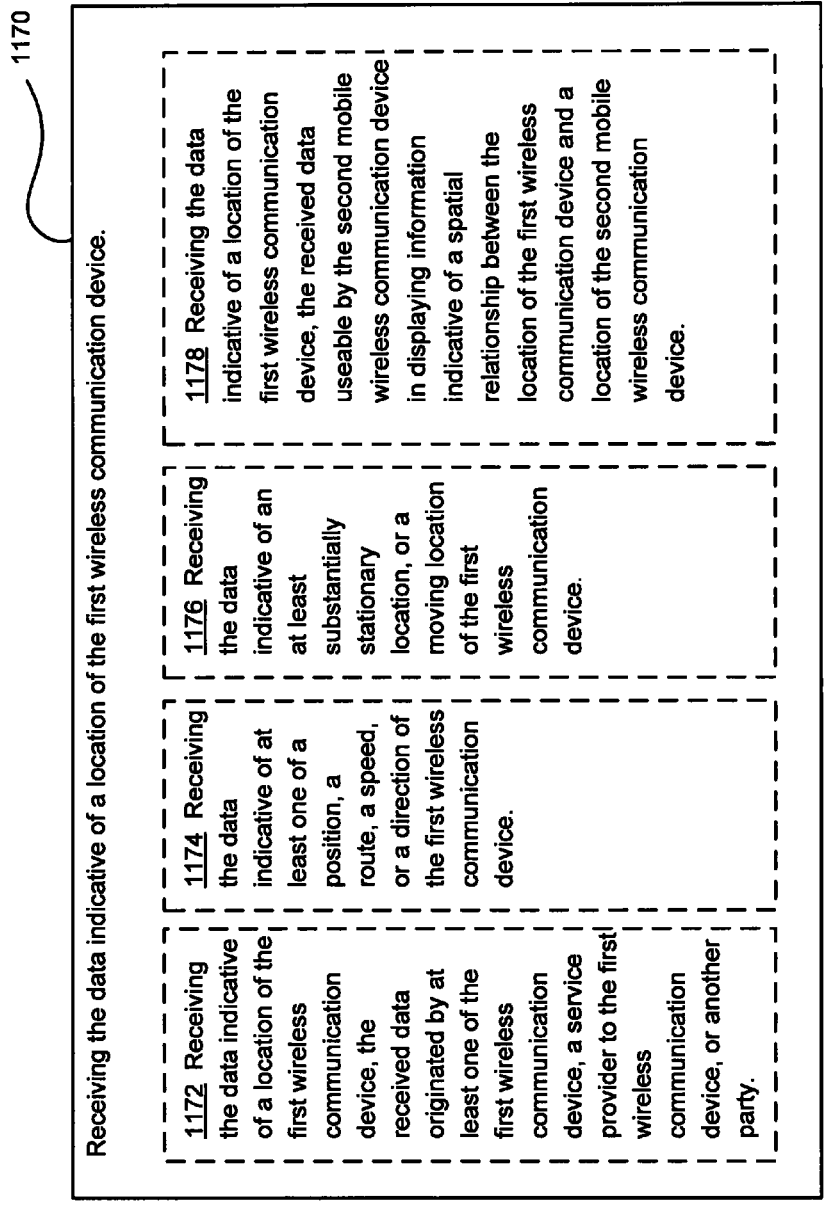
FIG. 21 illustrates an embodiment of the operational flow of FIG. 17.

FIG. 21 illustrates an embodiment of the operational flow 1100 of FIG. 18. The pairing operation 1170 may include at least one additional embodiment. The at least one additional embodiment may include an operation 1172, an operation 1174, an operation 1176, or an operation 1178. The operation 1172 receives the data indicative of a location of the first wireless communication device. The received data originated by at least one of the first wireless communication device, a service provider to the first wireless communication device, or another party. The operation 1172 may be implemented using the multiple location source receiver 972. The operation 1174 receives the data indicative of at least one of a position, a route, a speed, or a direction of the first wireless communication device. The operation 1174 may be implemented using the multiple data type receiver circuit 974. The operation 1176 receives the data indicative of an at least substantially stationary location, or a moving location of the first wireless communication device. The operation 1176 may be implemented using the static/dynamic location information circuit 976. The operation 1178 receives the data indicative of a location of the first wireless communication device. The received data is useable by the second mobile wireless communication device in displaying information indicative of a spatial relationship between the location of the first wireless communication device and a location of the second mobile wireless communication device. The operation 1178 may be implemented using the spatial relationship data receiver circuit 978.

Figure 22:
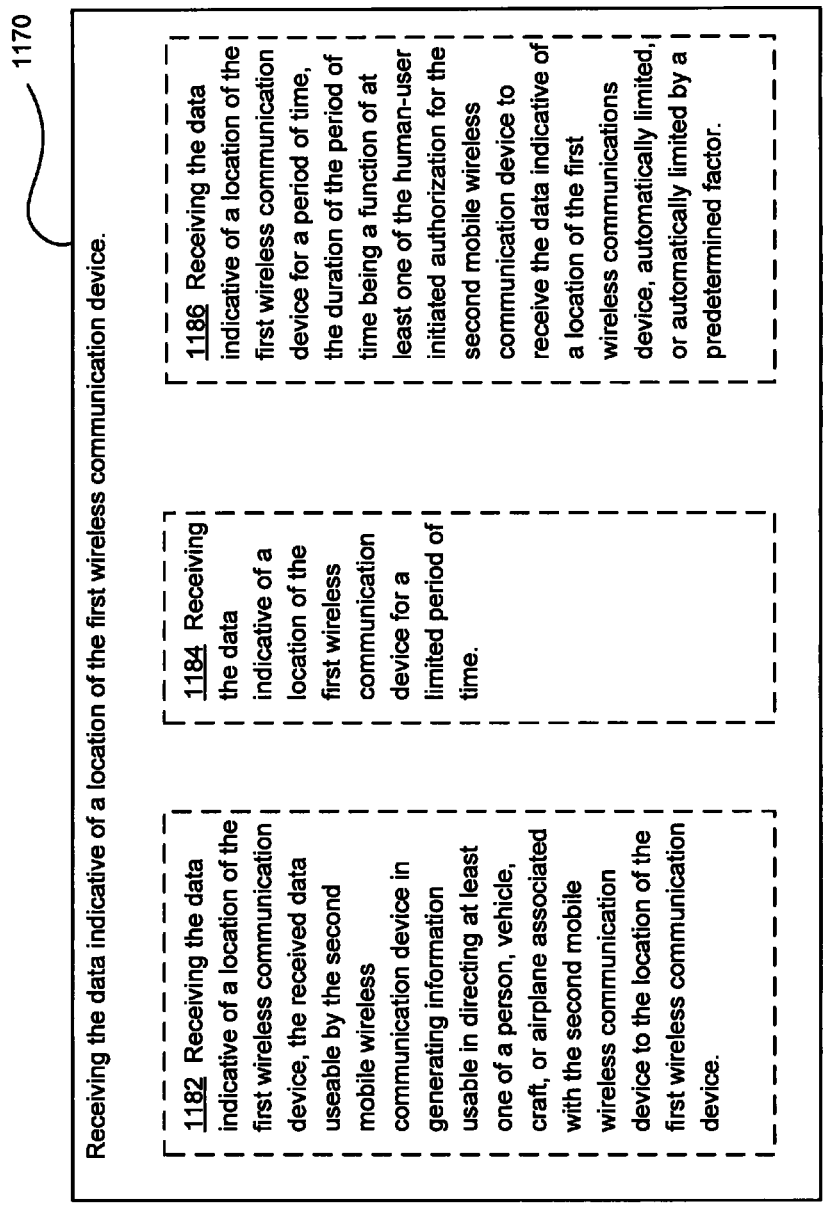
FIG. 22 illustrates another embodiment of the operational flow of FIG. 17.

FIG. 22 illustrates another embodiment of the operational flow 1100 of FIG. 18. The pairing operation 1170 may include at least one additional embodiment. The at least one additional embodiment may include an operation 1182, an operation 1184, or an operation 1186. The operation 1182 receives the data indicative of a location of the first wireless communication device. The received data is useable by the second mobile wireless communication device in generating information usable in directing at least one of a person, vehicle, craft, or airplane associated with the second mobile wireless communication device to the location of the first wireless communication device. For example, the generating information usable in directing may include generating information usable in guiding at least one of a person, vehicle, craft, or airplane associated with the second mobile wireless communication device to the location of the first wireless communication device. The operation 1182 may be implemented using the guidance data receiver circuit 982. The operation 1184 receives the data indicative of a location of the first wireless communication device for a limited period of time. The operation 1184 may be implemented using the time-limited data receiver circuit 984. The operation 1186 receives the data indicative of a location of the first wireless communication device for a period of time. The duration of the period of time being a function of at least one of the human-user initiated authorization for the second mobile wireless communication device to receive the data indicative of a location of the first wireless communications device, automatically limited, or automatically limited by a predetermined factor. The operation 1186 may be implemented using the duration-limited data receiver circuit 986.

Figure 23:
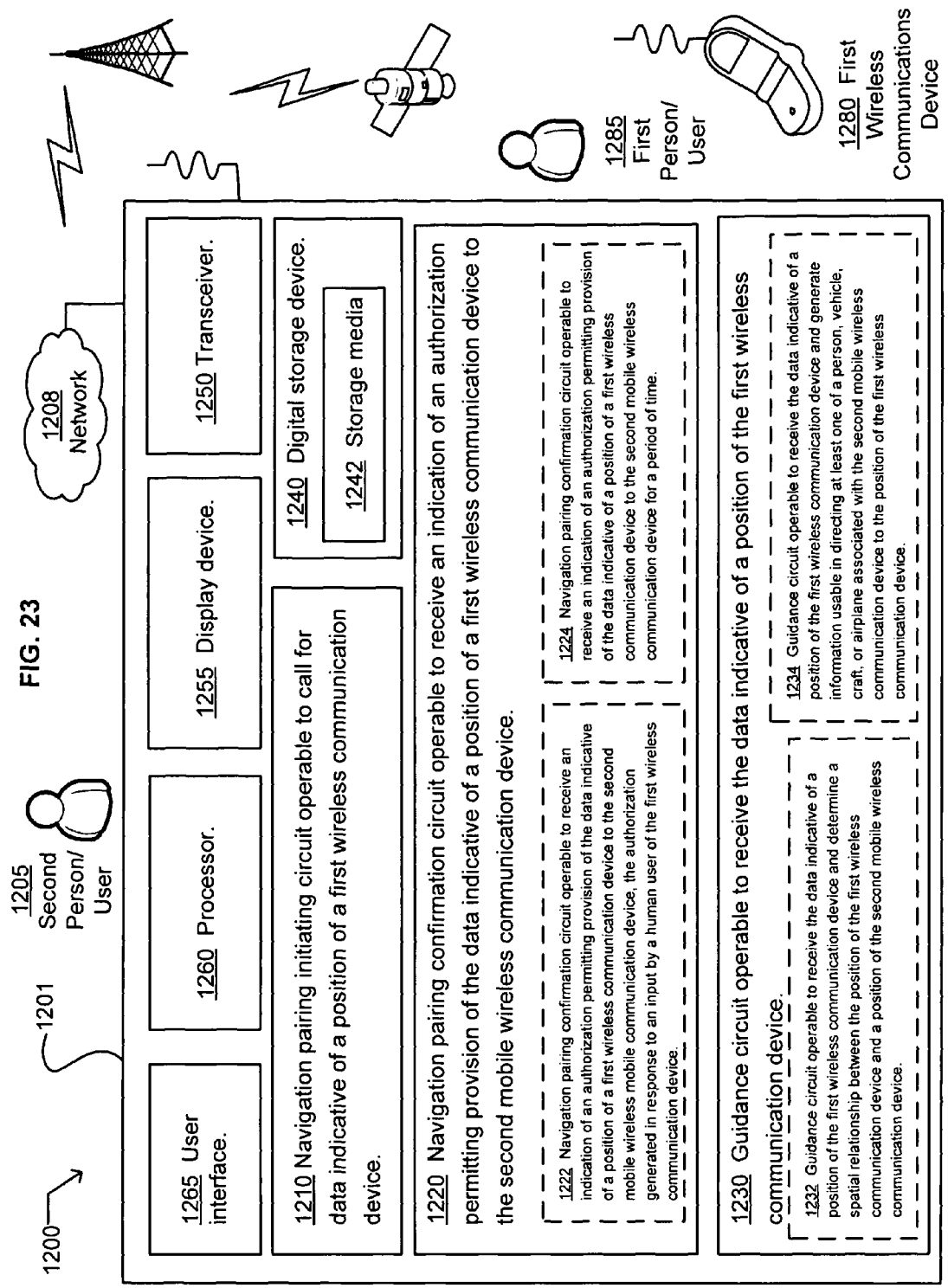
FIG. 23 illustrates an example environment.

FIG. 23 illustrates an example environment 1200. The environment includes a second mobile wireless communication device 1201 associatable with a second person/user 1205 and/or a vehicle [not shown]. The second mobile wireless communication device includes a navigation pairing initiation circuit 1210, a navigation pairing confirmation circuit 1220, and a guidance circuit 1230. In an embodiment, the second wireless communication device may include at least one of a digital storage device 1240, a transceiver 1250, a display device 1255, a processor 1260, or a user interface 1265. The environment also includes a network 1208 accessible by the second mobile wireless communication device, a first wireless communication device 1280 associatable with a first person/user 1285 and/or a vehicle [not shown].

The navigation paring initiation circuit 1210 is operable to call for data indicative of a position of a first wireless communication device. The navigation pairing confirmation circuit 1220 is operable to receive an indication of an authorization permitting provision of the data indicative of a position of a first wireless communication device to the second mobile wireless mobile communication device. The guidance circuit 1230 is operable to receive the data indicative of a position of the first wireless communication device.

In an embodiment, the navigation pairing confirmation circuit 1220 further includes a navigation pairing confirmation circuit 1222 operable to receive an indication of an authorization permitting provision of the data indicative of a position of a first wireless communication device to the second mobile wireless mobile communication device. The authorization generated in response to an input by a human user of the first wireless communication device. In another embodiment, the navigation pairing confirmation circuit further includes a navigation pairing confirmation circuit 1224 operable to receive an indication of an authorization permitting provision of the data indicative of a position of a first wireless communication device to the second mobile wireless communication device for a period of time.

In an embodiment, the guidance circuit 1230 further includes a guidance circuit 1232 operable to receive the data indicative of a position of the first wireless communication device and determine a spatial relationship between the position of the first wireless communication device and a position of the second mobile wireless communication device. In another embodiment, the guidance circuit further includes a guidance circuit 1234 operable to receive the data indicative of a position of the first wireless communication device and generate information usable in directing at least one of a person, vehicle, craft, or airplane associated with the second mobile wireless communication device to the position of the first wireless communication device.

FIG. 24 illustrates an example wireless communication apparatus 1300. The wireless communication apparatus includes means 1310 for transmitting a request for data indicative of a location of a first wireless communication device. The wireless communication apparatus also includes means 1320 for receiving an affirmative reply to the request for data indicative of a location of a first wireless communication device. The affirmative reply originating from the first wireless communication device and generated in response to an input received from a human user of the first wireless communication device. The wireless communication apparatus further includes means 1330 for receiving the data indicative of a location of the first wireless communication device.

Figure 25:
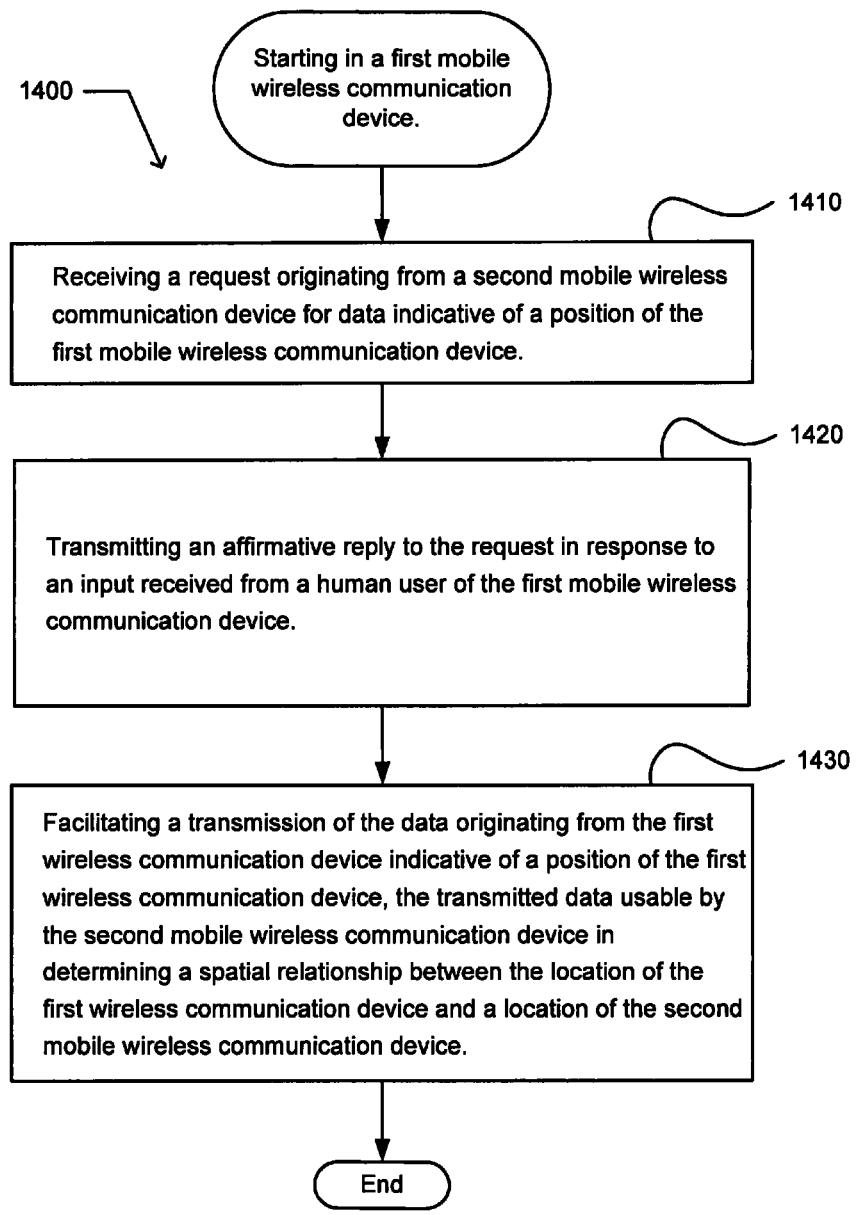
FIG. 25 illustrates an example operational flow performed in a first mobile wireless communications device.

FIG. 25 illustrates an example operational flow 1400 performed in a first mobile wireless communications device. After a start operation in a first mobile wireless communications device, an operation 1410 receives a request originating from a second mobile wireless communication device for data indicative of a position of the first mobile wireless communication device. An operation 1420 transmits an affirmative reply to the request in response to an input received from a human user of the first mobile wireless communication device. An operation 1430 facilitates a transmission of the data originating from the first wireless communication device indicative of a position of the first wireless communication device, the transmitted data usable by the second mobile wireless communication device in determining a spatial relationship between the location of the first wireless communication device and a location of the second mobile wireless communication device. The operational flow then moves to an end operation.

The foregoing detailed description has set forth various embodiments of the systems, apparatus, devices, computer program products, and/or processes using block diagrams, flow diagrams, operation diagrams, flowcharts, illustrations, and/or examples. A particular block diagram, operation diagram, flowchart, illustration, environment, and/or example should not be interpreted as having any dependency or requirement relating to any one or combination of components illustrated therein. For example, in certain instances, one or more elements of an environment may be deemed not necessary and omitted. In other instances, one or more other elements may be deemed necessary and added.

Insofar as such block diagrams, operation diagrams, flowcharts, illustrations, and/or examples contain one or more functions and/or operations, it will be understood that each function and/or operation within such block diagrams, operation diagrams, flowcharts, illustrations, or examples can be implemented, individually and/or collectively, by a wide range of hardware, software, firmware, or virtually any combination thereof unless otherwise indicated. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware. Those skilled in the art will recognize that optical aspects of implementations will typically employ optically-oriented hardware, software, and or firmware.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A second wireless communication device comprising:
   circuitry for transmitting a request for data indicative of a location of a first wireless communication device;
   circuitry for receiving an affirmative reply to the request for data indicative of the location of the first wireless communication device, the circuitry for receiving an affirmative reply configured to receive the affirmative reply originating from the first wireless communication device and generated in response to an input acquired via a user interface of the first wireless communication device, wherein the circuitry for receiving an affirmative reply is configured to receive the affirmative reply within a predetermined time window relative to the request; and circuitry for receiving the data indicative of the location of the first wireless communication device, including at least circuitry for receiving, continuously or at predefined intervals, the data indicative of the location of the first wireless communication device for a limited period of time and within a predetermined radius of the first wireless communication device relative to a location of the second wireless communication device, and further including at least circuitry for receiving as the data indicative of the location of the first wireless communication device data indicative of at least a position, a route, a speed, and a direction of the first wireless communication device.

2. The second wireless communication device of claim 1, wherein the circuitry for transmitting a request for data indicative of a location of a first wireless communication device comprises:

circuitry for transmitting the request for data indicative of the location of the first wireless communication device in response to an input acquired via a user interface of the second wireless communication device.

3. The second wireless communication device of claim 1, wherein the circuitry for transmitting a request for data indicative of a location of a first wireless communication device comprises:

circuitry for transmitting the request for data indicative of the location of a positioning-enabled first wireless communication device.

4. The second wireless communication device of claim 1, wherein the circuitry for transmitting a request for data indicative of a location of a first wireless communication device comprises:

circuitry for transmitting the request for data indicative of dynamic locations of the first wireless communication device.

5. The second wireless communication device of claim 1, wherein the circuitry for receiving an affirmative reply to the request for data indicative of the location of the first wireless communication device, the circuitry for receiving an affirmative reply configured to receive the affirmative reply originating from the first wireless communication device and generated in response to an input acquired via a user interface of the first wireless communication device, wherein the circuitry for receiving an affirmative reply is configured to receive the affirmative reply within a predetermined time window relative to the request comprises:

circuitry for receiving proximate in time to the transmission of the request the affirmative reply to the request for data indicative of the location of the first wireless communication device.

6. The second wireless communication device of claim 1, wherein the circuitry for receiving an affirmative reply to the request for data indicative of the location of the first wireless communication device, the circuitry for receiving an affirmative reply configured to receive the affirmative reply originating from the first wireless communication device and generated in response to an input acquired via a user interface of the first wireless communication device, wherein the circuitry for receiving an affirmative reply is configured to receive the affirmative reply within a predetermined time window relative to the request comprises:

circuitry for receiving subsequent to the transmission of the request the affirmative reply to the request for data indicative of the location of the first wireless communication device.

7. The second wireless communication device of claim 1, wherein the circuitry for receiving an affirmative reply to the request for data indicative of the location of the first wireless communication device, the circuitry for receiving an affirmative reply configured to receive the affirmative reply originating from the first wireless communication device and generated in response to an input acquired via a user interface of the first wireless communication device, wherein the circuitry for receiving an affirmative reply is configured to receive the affirmative reply within a predetermined time window relative to the request comprises:

circuitry for receiving in response to the transmitted request the affirmative reply to the request for data indicative of the location of the first wireless communication device.

8. The second wireless communication device of claim 1, wherein the circuitry for receiving an affirmative reply to the request for data indicative of the location of the first wireless communication device, the circuitry for receiving an affirmative reply configured to receive the affirmative reply originating from the first wireless communication device and generated in response to an input acquired via a user interface of the first wireless communication device, wherein the circuitry for receiving an affirmative reply is configured to receive the affirmative reply within a predetermined time window relative to the request comprises:

circuitry for receiving the affirmative reply to the request for data indicative of the location of the first wireless communication device that authorizes at least the second wireless communication device and a third wireless communication device to receive the data indicative of the location of the first wireless communication device.

9. The second wireless communication device of claim 1, wherein the circuitry for receiving an affirmative reply to the request for data indicative of the location of the first wireless communication device, the circuitry for receiving an affirmative reply configured to receive the affirmative reply originating from the first wireless communication device and generated in response to an input acquired via a user interface of the first wireless communication device, wherein the circuitry for receiving an affirmative reply is configured to receive the affirmative reply within a predetermined time window relative to the request comprises:

circuitry for receiving, concurrently with the receiving of the affirmative reply, the data indicative of the location of the first wireless communication device.

10. The second wireless communication device of claim 1, wherein the circuitry for receiving the data indicative of the location of the first wireless communication device comprises:

circuitry for receiving the data indicative of a stationary location or a moving location of the first wireless communication device.

11. The second wireless communication device of claim 1, further comprising:

circuitry for, based at least in part on the received data indicative of the location of the first wireless communication device, displaying information indicative of a spatial relationship between the location of the first wireless communication device and the location of the second wireless communication device.

12. The second wireless communication device of claim 1, further comprising:
- circuitry for, based at least in part on the received data indicative of the location of the first wireless communication device, generating information usable in directing at least one of a person, vehicle, craft, or airplane associated with the second wireless communication device to the location of the first wireless communication device.

13. The second wireless communication device of claim 1, further comprising:
- circuitry for, based at least in part on the received data indicative of the location of the first wireless communication device, displaying information configured to direct at least one of a person, vehicle, craft, or airplane associated with the second wireless communication device to the location of the first wireless communication device.

14. The second wireless communication device of claim 1, wherein the circuitry for receiving an affirmative reply to the request for data indicative of the location of the first wireless communication device, the circuitry for receiving an affirmative reply configured to receive the affirmative reply originating from the first wireless communication device and generated in response to an input acquired via a user interface of the first wireless communication device, wherein the circuitry for receiving an affirmative reply is configured to receive the affirmative reply within a predetermined time window relative to the request comprises:
- circuitry for receiving the data indicative of the location of the first wireless communication device as the affirmative reply to the request for data indicative of the location of a first wireless communication device.

15. The second wireless communication device of claim 1, wherein the circuitry for receiving the data indicative of the location of the first wireless communication device, including at least circuitry for receiving, continuously or at predefined intervals, the data indicative of the location of the first wireless communication device for a limited period of time and within a predetermined radius of the first wireless communication device relative to a location of the second wireless communication device, and further including at least circuitry for receiving as the data indicative of the location of the first wireless communication device data indicative of at least a position, a route, a speed, and a direction of the first wireless communication device comprises:
- circuitry for receiving the data indicative of the location of the first wireless communication device, including at least circuitry for receiving, continuously or at predefined intervals, data indicative of changes in the location of the first wireless communication device.

16. The second wireless communication device of claim 1, wherein the circuitry for receiving the data indicative of the location of the first wireless communication device, including at least circuitry for receiving, continuously or at predefined intervals, the data indicative of the location of the first wireless communication device for a limited period of time and within a predetermined radius of the first wireless communication device relative to a location of the second wireless communication device, and further including at least circuitry for receiving as the data indicative of the location of the first wireless communication device data indicative of at least a position, a route, a speed, and a direction of the first wireless communication device comprises:
- circuitry for receiving the data indicative of the location of the first wireless communication device, including at least circuitry for receiving, continuously or at predefined intervals, data indicative of changes in the location of the first wireless communication device, the circuitry for receiving configured to terminate receiving the data indicative of the location of the first wireless communication when there have been no changes in the location of the first wireless communication device for a predetermined period of time.

17. A method comprising:
- receiving ongoing data indicative of a location of a first wireless communication device from the first wireless communication device in response to one or more respective human-user initiated authorizations exchanged between the first wireless communication device and a second wireless communication device, including at least receiving, continuously or at predefined intervals, the data indicative of the location of the first wireless communication device for a limited period of time and within a predetermined radius of the first wireless communication device relative to a location of the second wireless communication device, and further including at least receiving as the data indicative of the location of the first wireless communication device data indicative of at least a position, a route, a speed, and a direction of the first wireless communication device;
- wherein at least one of the exchanged one or more respective human-user initiated authorizations includes the second wireless communication device transmitting, to the first wireless communication device, a request that data indicative of the location of the first wireless communication device be provided at least to the second wireless communication device; and
- wherein at least one of the exchanged one or more respective human-user initiated authorizations includes at least the second wireless communication device receiving as an affirmative reply to the request for data indicative of the location of the first wireless communication device, the data indicative of the location of the first wireless communication device, the affirmative reply being received within a predetermined time window relative to the request.

18. The method of claim 17, wherein the second wireless communication device transmitting, to the first wireless communication device, a request that data indicative of the location of the first wireless communication device be provided at least to the second wireless communication device comprises:
- transmitting the request for data indicative of the location of a positioning-enabled first wireless communication device.

19. The method of claim 17, wherein the second wireless communication device transmitting, to the first wireless communication device, a request that data indicative of the location of the first wireless communication device be provided at least to the second wireless communication device comprises:
- transmitting the request for data indicative of dynamic locations of the first wireless communication device.

20. The method of claim 17, wherein the receiving ongoing data indicative of a location of a first wireless communication device comprises:
- receiving the data indicative of a stationary location or a moving location of the first wireless communication device.

21. The method of claim 17, further comprising:
- displaying information indicative of a spatial relationship between the location of the first wireless communication device and the location of the second wireless communication device, the displaying based at least in part on the received data indicative of the location of the first wireless communication device.

22. The second wireless communication apparatus of claim 21 wherein the means for receiving an affirmative reply to the request for data indicative of the location of the first wireless communication device, the means for receiving an affirmative reply being configured to receive the affirmative reply originating from the first wireless communication device and generated in response to an input acquired via a user interface of the first wireless communication device, wherein the means for receiving an affirmative reply is further configured to receive the affirmative reply within a predetermined time window relative to the request comprises:
means for receiving as the affirmative reply to the request for data indicative of the location of the first wireless communication device, the data indicative of the location of the first wireless communication device.

23. The method of claim 17, further comprising:
generating information usable in directing at least one of a person or a vehicle associated with the second wireless communication device to the location of the first wireless communication device, the generating based at least in part on the received data indicative of the location of the first wireless communication device.

24. The method of claim 17, further comprising:
displaying information configured to direct at least one of a person or a vehicle associated with the second wireless communication device to the location of the first wireless communication device, the displaying based at least in part on the received data indicative of the location of the first wireless communication device.

25. The method of claim 17, wherein the receiving ongoing data indicative of a location of a first wireless communication device from the first wireless communication device in response to one or more respective human-user initiated authorizations exchanged between the first wireless communication device and a second wireless communication device, including at least receiving, continuously or at predefined intervals, the data indicative of the location of the first wireless communication device for a limited period of time and within a predetermined radius of the first wireless communication device relative to a location of the second wireless communication device, and further including at least receiving as the data indicative of the location of the first wireless communication device data indicative of at least a position, a route, a speed, and a direction of the first wireless communication device comprises:
receiving the ongoing data indicative of the location of the first wireless communication device, including at least receiving, continuously or at predefined intervals, data indicative of changes in the location of the first wireless communication device.

26. A method comprising:
transmitting a request for data indicative of a location of a first wireless communication device;
receiving an affirmative reply to the request for data indicative of the location of the first wireless communication device, the received affirmative reply originating from the first wireless communication device and generated in response to an input acquired via a user interface of the first wireless communication device, wherein the affirmative reply is received within a predetermined time window relative to the request;
receiving the data indicative of the location of the first wireless communication device, including at least receiving, continuously or at predefined intervals, the data indicative of the location of the first wireless communication device for a limited period of time and within a predetermined radius of the first wireless communication device relative to a location of a second wireless communication device, and further including at least receiving as the data indicative of the location of the first wireless communication device data indicative of at least a position, a route, a speed, and a direction of the first wireless communication device.

27. The method of claim 26, wherein the transmitting a request for data indicative of a location of a first wireless communication device comprises:
transmitting the request for data indicative of the location of a positioning-enabled first wireless communication device.

28. The method of claim 26, wherein the transmitting a request for data indicative of a location of a first wireless communication device comprises:
transmitting the request for data indicative of dynamic locations of the first wireless communication device.

29. The method of claim 26, wherein the receiving the data indicative of the location of the first wireless communication device comprises:
receiving the data indicative of a stationary location or a moving location of the first wireless communication device.

30. The method of claim 26, further comprising:
displaying information indicative of a spatial relationship between the location of the first wireless communication device and the location of the second wireless communication device, the displaying based at least in part on the received data indicative of the location of the first wireless communication device.

31. The method of claim 26, further comprising:
generating information usable in directing at least one of a person or a vehicle associated with the second wireless communication device to the location of the first wireless communication device, the generating based at least in part on the received data indicative of the location of the first wireless communication device.

32. The method of claim 26, further comprising:
displaying information configured to direct at least one of a person or a vehicle associated with the second wireless communication device to the location of the first wireless communication device, the displaying based at least in part on the received data indicative of the location of the first wireless communication device.

33. The method of claim 26, wherein the receiving the data indicative of the location of the first wireless communication device, including at least receiving, continuously or at predefined intervals, the data indicative of the location of the first wireless communication device for a limited period of time and within a predetermined radius of the first wireless communication device relative to a location of a second wireless communication device, and further including at least receiving as the data indicative of the location of the first wireless communication device data indicative of at least a position, a route, a speed, and a direction of the first wireless communication device comprises:
receiving the data indicative of the location of the first wireless communication device, including at least receiving, continuously or at predefined intervals, data indicative of changes in the location of the first wireless communication device.

34. A method comprising:
receiving a request for data indicative of a location of a first wireless communication device;
transmitting an affirmative reply to the request for data indicative of the location of the first wireless communication device, the transmitted affirmative reply originating from the first wireless communication device and generated in response to an input acquired via a user interface of the first wireless communication device, wherein the affirmative reply is transmitted within a predetermined time window relative to the request; and
transmitting the data indicative of the location of the first wireless communication device, including at least transmitting, continuously or at predefined intervals, the data indicative of the location of the first wireless communication device for a limited period of time and within a predetermined radius of the first wireless communication device relative to a location of the second wireless communication device, and further including at least transmitting as the data indicative of the location of the first wireless communication device data indicative of at least a position, a route, a speed, and a direction of the first wireless communication device.

35. The method of claim 34, wherein the receiving a request for data indicative of a location of a first wireless communication device comprises:
receiving the request for data indicative of the location of a positioning-enabled first wireless communication device.

36. The method of claim 34, wherein the receiving a request for data indicative of a location of a first wireless communication device comprises:
receiving the request for data indicative of dynamic locations of the first wireless communication device.

37. The method of claim 34, wherein the transmitting the data indicative of the location of the first wireless communication device comprises:
transmitting the data indicative of a stationary location or a moving location of the first wireless communication device.

38. The method of claim 34, further comprising:
transmitting data configured to facilitate a display of information indicative of a spatial relationship between the location of the first wireless communication device and the location of the second wireless communication device, the transmitting including at least transmitting data indicative of the location of the first wireless communication device.

39. The method of claim 34, further comprising:
transmitting data configured to facilitate generation of information usable in directing at least one of a person or a vehicle associated with the second wireless communication device to the location of the first wireless communication device, the transmitting including at least transmitting data indicative of the location of the first wireless communication device.

40. The method of claim 34, further comprising:
transmitting data configured to facilitate display of information configured to direct at least one of a person or a vehicle associated with the second wireless communication device to the location of the first wireless communication device, the transmitting including at least transmitting data indicative of the location of the first wireless communication device.

41. The method of claim 34, wherein the transmitting the data indicative of the location of the first wireless communication device, including at least transmitting, continuously or at predefined intervals, the data indicative of the location of the first wireless communication device for a limited period of time and within a predetermined radius of the first wireless communication device relative to a location of the second wireless communication device, and further including at least transmitting as the data indicative of the location of the first wireless communication device data indicative of at least a position, a route, a speed, and a direction of the first wireless communication device comprises:
transmitting the data indicative of the location of the first wireless communication device, including at least transmitting, continuously or at predefined intervals, data indicative of changes in the location of the first wireless communication device.

42. A second wireless communication device comprising:
a navigation pairing initiation circuit configured to call for data indicative of a position of a first wireless communication device;
a navigation pairing confirmation circuit configured to receive an indication of an authorization permitting provision of the data indicative of the position of the first wireless communication device at least to the second wireless communication device, the navigation pairing confirmation circuit being configured to receive the indication of the authorization originating from the first wireless communication device and generated in response to an input acquired via a user interface of the first wireless communication device, wherein the navigation pairing confirmation circuit is further configured to receive the indication of the authorization within a predetermined time window relative to the call for data indicative of the position of the first wireless communication device; and
a guidance circuit configured to receive the data indicative of the position of the first wireless communication device, the guidance circuit further configured to receive, continuously or at predefined intervals, the data indicative of the position of the first wireless communication device for a limited period of time and within a predetermined radius of the first wireless communication device relative to a position of the second wireless communication device, the guidance circuit further configured to receive as the data indicative of the location of the first wireless communication device data indicative of at least a position, a route, a speed, and a direction of the first wireless communication device.

43. The second wireless communication device of claim 42, wherein the guidance circuit configured to receive the data indicative of the position of the first wireless communication device comprises:
a guidance circuit configured to receive the data indicative of the position of the first wireless communication device and determine a spatial relationship between the position of the first wireless communication device and the position of the second wireless communication device.

44. A second wireless communication apparatus comprising:
means for transmitting a request that data indicative of a location of a first wireless communication device be provided to the second wireless communication apparatus;
means for receiving an affirmative reply to the request for data indicative of the location of the first wireless communication device, the means for receiving an affirmative reply being configured to receive the affirmative reply originating from the first wireless communication device and generated in response to an input acquired via a user interface of the first wireless communication device, wherein the means for receiving an affirmative reply is further configured to receive the affirmative reply within a predetermined time window relative to the request; and means for receiving the data indicative of the location of the first wireless communication device, including at least means for receiving, continuously or at predefined intervals, the data indicative of the location of the first wireless communication device for a limited period of time and within a predetermined radius of the first wireless communication device relative to a location of the second wireless communication apparatus, and further including at least means for receiving as the data indicative of the location of the first wireless communication device data indicative of at least a position, a route, a speed, and a direction of the first wireless communication device.

45. The second wireless communication apparatus of claim 44 wherein the means for receiving an affirmative reply to the request for data indicative of the location of the first wireless communication device, the means for receiving an affirmative reply being configured to receive the affirmative reply originating from the first wireless communication device and generated in response to an input acquired via a user interface of the first wireless communication device, wherein the means for receiving an affirmative reply is further configured to receive the affirmative reply within a predetermined time window relative to the request comprises:

means for receiving the data indicative of the location of the first wireless communication device as the affirmative reply to the request for data indicative of the location of the first wireless communication device.

* * * * *